(12) United States Patent
McDermott et al.

(10) Patent No.: US 8,675,711 B1
(45) Date of Patent: Mar. 18, 2014

(54) SYSTEM AND METHODS FOR DYNAMIC SPREAD SPECTRUM USAGE

(75) Inventors: Scott McDermott, Washington, DC (US); Er-Hsien Fu, Washington, DC (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 249 days.

(21) Appl. No.: 12/890,578

(22) Filed: Sep. 24, 2010

Related U.S. Application Data

(60) Provisional application No. 61/246,063, filed on Sep. 25, 2009.

(51) Int. Cl.
  *H04B 1/00* (2006.01)
(52) U.S. Cl.
  USPC .......................................... 375/146
(58) Field of Classification Search
  None
  See application file for complete search history.

(56) References Cited

U.S. PATENT DOCUMENTS

| | | | |
|---|---|---|---|
| 4,486,739 A | 12/1984 | Franaszek et al. | |
| 4,649,396 A | 3/1987 | Friedman | |
| 4,876,737 A | 10/1989 | Woodworth et al. | |
| 4,901,307 A | 2/1990 | Gilhousen et al. | |
| 5,109,390 A | 4/1992 | Gilhousen et al. | |
| 5,309,474 A | 5/1994 | Gilhousen et al. | |
| 5,376,778 A | 12/1994 | Kreft | |
| 5,490,165 A | 2/1996 | Blakeney, II et al. | |
| 5,537,397 A | 7/1996 | Abramson | |
| 5,559,790 A | 9/1996 | Yano et al. | |
| 5,566,168 A | 10/1996 | Dent | |
| 5,568,472 A | 10/1996 | Umeda et al. | |
| 5,570,350 A * | 10/1996 | Myer et al. | 370/335 |
| 5,594,454 A | 1/1997 | Devereux et al. | |
| 5,612,949 A | 3/1997 | Bennett | |
| 5,625,629 A | 4/1997 | Wenk | |
| 5,640,166 A | 6/1997 | Siwiak | |
| 5,668,556 A | 9/1997 | Rouffet et al. | |

(Continued)

FOREIGN PATENT DOCUMENTS

| | | |
|---|---|---|
| DE | 102004016548 A1 | 10/2005 |
| EP | 1406207 A1 | 4/2004 |

OTHER PUBLICATIONS

DVB User Guidelines for the Second Generation System for Broadcasting, Interactive Services, News Gathering and Other Broadband Satellite Applications (DVB-S2), ETSI TR 102 376 v.1.1.1 Technical Report, 2005, 104 pgs.

(Continued)

*Primary Examiner* — Chieh M Fan
*Assistant Examiner* — Bahman Badipour
(74) *Attorney, Agent, or Firm* — Morgan, Lewis & Bockius LLP

(57) ABSTRACT

A transmitter transmits a signal to a receiver using spread spectrum signals. The transmitter generates a respective signal. The transmitter separates the respective signal into multiple predefined portions, wherein each predefined portion is below a noise floor. The transmitter transmits at least a plurality of the predefined portions of the respective signal at discrete bandwidth intervals in accordance with a spread spectrum signal splitting technique. The discrete bandwidth intervals are portions of spectrum that are available for transmission. The receiver receives at least a plurality of the multiple predefined portions of the respective signal at the discrete bandwidth intervals. The receiver reconstructs the respective signal using at least a plurality of the predefined portions in accordance with the spread spectrum signal splitting technique.

4 Claims, 19 Drawing Sheets

(56) References Cited

U.S. PATENT DOCUMENTS

| | | | |
|---|---|---|---|
| 5,694,396 A * | 12/1997 | Firouzbakht et al. | 370/480 |
| 5,697,050 A | 12/1997 | Wiedeman | |
| 5,724,384 A | 3/1998 | Kim et al. | |
| 5,758,260 A | 5/1998 | Wiedeman | |
| 5,790,070 A | 8/1998 | Natarajan et al. | |
| 5,796,777 A | 8/1998 | Terlep et al. | |
| 5,815,071 A | 9/1998 | Doyle | |
| 5,818,883 A * | 10/1998 | Smith et al. | 375/347 |
| 5,835,069 A | 11/1998 | Skoog | |
| 5,841,765 A | 11/1998 | Fielding et al. | |
| 5,872,777 A | 2/1999 | Brailean et al. | |
| 5,920,278 A | 7/1999 | Tyler et al. | |
| 5,983,111 A | 11/1999 | Kim | |
| 5,999,561 A * | 12/1999 | Naden et al. | 375/142 |
| 6,052,561 A | 4/2000 | Rudowicz et al. | |
| 6,084,919 A * | 7/2000 | Kleider et al. | 375/285 |
| 6,088,413 A | 7/2000 | Autry et al. | |
| 6,100,806 A | 8/2000 | Gaukel | |
| 6,121,922 A | 9/2000 | Mohan | |
| 6,128,276 A * | 10/2000 | Agee | 370/208 |
| 6,128,469 A | 10/2000 | Zenick, Jr. et al. | |
| 6,151,313 A | 11/2000 | Abramson | |
| 6,163,681 A | 12/2000 | Wright et al. | |
| 6,185,245 B1 | 2/2001 | Kim | |
| 6,188,682 B1 | 2/2001 | Takagi et al. | |
| 6,205,167 B1 | 3/2001 | Kamgar et al. | |
| 6,226,531 B1 | 5/2001 | Holt et al. | |
| 6,301,316 B1 * | 10/2001 | Uchida et al. | 375/347 |
| 6,307,840 B1 | 10/2001 | Wheatley, III et al. | |
| 6,317,029 B1 | 11/2001 | Fleeter | |
| 6,339,611 B1 | 1/2002 | Antonio et al. | |
| 6,349,110 B1 | 2/2002 | Davidovici et al. | |
| 6,353,730 B1 | 3/2002 | Buettner et al. | |
| D455,641 S | 4/2002 | Trifilio | |
| 6,373,831 B1 | 4/2002 | Secord et al. | |
| 6,396,819 B1 | 5/2002 | Fleeter et al. | |
| 6,421,373 B1 | 7/2002 | Saito | |
| 6,438,118 B1 * | 8/2002 | Matui | 370/335 |
| 6,507,602 B1 | 1/2003 | Dent | |
| 6,510,172 B1 | 1/2003 | Miller | |
| 6,529,488 B1 * | 3/2003 | Urs et al. | 370/330 |
| 6,549,559 B2 | 4/2003 | Kamgar et al. | |
| 6,574,205 B1 | 6/2003 | Sato | |
| 6,628,699 B2 | 9/2003 | Ramberg et al. | |
| 6,639,906 B1 | 10/2003 | Levin | |
| 6,683,605 B1 | 1/2004 | Bi et al. | |
| 6,720,801 B2 | 4/2004 | Houlberg | |
| 6,728,298 B1 | 4/2004 | Okubo et al. | |
| 6,754,190 B2 | 6/2004 | Gurney et al. | |
| 6,763,056 B1 | 7/2004 | Ohsuge | |
| 6,768,729 B1 | 7/2004 | Ohsuge | |
| 6,799,094 B1 | 9/2004 | Vaida et al. | |
| 6,826,169 B1 * | 11/2004 | Nagatani et al. | 370/342 |
| 6,876,645 B1 | 4/2005 | Guey et al. | |
| 6,894,995 B2 | 5/2005 | Chitrapu et al. | |
| 6,944,149 B1 | 9/2005 | Kim et al. | |
| 6,985,512 B1 | 1/2006 | McDermott et al. | 375/147 |
| 7,006,032 B2 | 2/2006 | King et al. | |
| 7,053,767 B2 | 5/2006 | Petite et al. | |
| 7,110,435 B1 | 9/2006 | Sorrells et al. | |
| 7,131,136 B2 | 10/2006 | Monroe | |
| 7,203,630 B2 | 4/2007 | Kolb et al. | |
| 7,227,884 B2 | 6/2007 | McDermott | 375/147 |
| 7,236,778 B2 | 6/2007 | Schreiber | |
| D554,474 S | 11/2007 | Miller | |
| 7,394,870 B2 | 7/2008 | Chien et al. | |
| D574,221 S | 8/2008 | Allen | |
| 7,430,257 B1 * | 9/2008 | Shattil | 375/347 |
| 7,433,391 B2 | 10/2008 | Stafford et al. | 375/150 |
| D582,918 S | 12/2008 | Scott | |
| 7,592,953 B2 | 9/2009 | Morana | |
| 7,706,748 B2 * | 4/2010 | Dutta | 455/13.3 |
| 7,848,458 B2 * | 12/2010 | Ochiai et al. | 375/316 |
| 7,876,259 B2 * | 1/2011 | Schuchman | 342/37 |
| 8,054,866 B2 * | 11/2011 | Sasaoka et al. | 375/141 |
| 2002/0024965 A1 | 2/2002 | Lee | |
| 2002/0067759 A1 * | 6/2002 | Ertel et al. | 375/141 |
| 2002/0089434 A1 | 7/2002 | Ghazarian | |
| 2002/0097690 A1 | 7/2002 | Fleeter et al. | |
| 2002/0173888 A1 | 11/2002 | Shelton et al. | |
| 2002/0177476 A1 | 11/2002 | Chou | |
| 2002/0191632 A1 | 12/2002 | McDermott | |
| 2003/0053521 A1 * | 3/2003 | Huang et al. | 375/144 |
| 2003/0063576 A1 | 4/2003 | DiFazio | |
| 2003/0123384 A1 * | 7/2003 | Agee | 370/208 |
| 2003/0161428 A1 | 8/2003 | Garrett et al. | |
| 2003/0202485 A1 | 10/2003 | Mansfield | |
| 2003/0204378 A1 * | 10/2003 | Cai | 702/189 |
| 2003/0235148 A1 * | 12/2003 | Yang | 370/206 |
| 2004/0001534 A1 * | 1/2004 | Yang | 375/143 |
| 2004/0008253 A1 | 1/2004 | Monroe | |
| 2004/0029579 A1 | 2/2004 | Kashiwase | |
| 2004/0029615 A1 | 2/2004 | Gerry et al. | |
| 2004/0117611 A1 | 6/2004 | Huber et al. | |
| 2004/0121729 A1 | 6/2004 | Herndon et al. | |
| 2004/0183673 A1 | 9/2004 | Nageli | |
| 2004/0246104 A1 | 12/2004 | Baechtiger et al. | |
| 2005/0038601 A1 | 2/2005 | Dentinger et al. | |
| 2005/0041573 A1 | 2/2005 | Eom et al. | |
| 2005/0060339 A1 | 3/2005 | McGee | |
| 2005/0076034 A1 | 4/2005 | Addonisio et al. | |
| 2005/0143005 A1 | 6/2005 | Moore, III | |
| 2005/0175123 A1 | 8/2005 | Gurney et al. | |
| 2005/0176436 A1 | 8/2005 | Mantravadi et al. | |
| 2005/0201311 A1 | 9/2005 | Willey et al. | |
| 2005/0201326 A1 * | 9/2005 | Lakkis | 370/329 |
| 2005/0248456 A1 | 11/2005 | Britton, Jr. et al. | |
| 2005/0281319 A1 | 12/2005 | Schilling | |
| 2006/0055561 A1 | 3/2006 | Kamali et al. | |
| 2006/0094450 A1 | 5/2006 | Park et al. | |
| 2006/0140314 A1 | 6/2006 | Kim et al. | |
| 2006/0141930 A1 | 6/2006 | Keen et al. | |
| 2006/0187026 A1 | 8/2006 | Kochis | |
| 2006/0233147 A1 * | 10/2006 | Karabinis | 370/342 |
| 2006/0251107 A1 | 11/2006 | Geren et al. | |
| 2007/0031150 A1 | 2/2007 | Fisher et al. | |
| 2007/0040647 A1 | 2/2007 | Saenz et al. | |
| 2007/0064641 A1 * | 3/2007 | Laroia et al. | 370/320 |
| 2007/0086335 A1 * | 4/2007 | McCanne et al. | 370/229 |
| 2007/0116158 A1 | 5/2007 | Guo et al. | |
| 2007/0117515 A1 | 5/2007 | Sinibaldi et al. | |
| 2007/0130599 A1 | 6/2007 | Monroe | |
| 2007/0202816 A1 * | 8/2007 | Zheng | 455/91 |
| 2007/0223425 A1 * | 9/2007 | Masui et al. | 370/335 |
| 2007/0291826 A1 | 12/2007 | Hafuka | |
| 2007/0293149 A1 | 12/2007 | Wubker | |
| 2007/0298786 A1 | 12/2007 | Meyers et al. | |
| 2008/0030345 A1 | 2/2008 | Austin et al. | |
| 2008/0043653 A1 * | 2/2008 | Lakkis | 370/310 |
| 2008/0181170 A1 | 7/2008 | Branlund et al. | |
| 2009/0042516 A1 * | 2/2009 | Karabinis | 455/73 |
| 2009/0046771 A1 | 2/2009 | Abe et al. | |
| 2009/0135954 A1 | 5/2009 | Salhov et al. | |
| 2009/0175299 A1 | 7/2009 | Hosokawa et al. | |
| 2009/0238246 A1 * | 9/2009 | Dawid et al. | 375/148 |
| 2009/0257517 A1 * | 10/2009 | Nordstrom et al. | 375/260 |
| 2009/0279620 A1 * | 11/2009 | Schenk | 375/260 |
| 2009/0298422 A1 * | 12/2009 | Conroy et al. | 455/12.1 |
| 2009/0316759 A1 | 12/2009 | Zeira | |
| 2010/0064091 A1 * | 3/2010 | Futenma et al. | 711/5 |
| 2010/0166180 A1 | 7/2010 | Steer et al. | |
| 2010/0322334 A1 * | 12/2010 | Wang et al. | 375/267 |
| 2011/0038261 A1 * | 2/2011 | Carlstrom | 370/230 |

OTHER PUBLICATIONS

HT PHY Specification, Enhanced Wireless Consortium publication V1.27, Dec. 23, 2005, 67 pgs.

Morana, Notice of Allowance, U.S. Appl. No. 12/585,056, Nov. 20, 2012, 5 pgs.

Singleton, Office Action, U.S. Appl. No. 12/693,116, Oct. 26, 2012, 9 pgs.

Fleeter, Office Action, U.S. Appl. No. 13/422,173, Jun. 8, 2012, 16 pgs.

(56) References Cited

OTHER PUBLICATIONS

Fleeter, Office Action, U.S. Appl. No. 13/422,195, Jul. 16, 2012, 23 pgs.
Morana, Office Action, U.S. Appl. No. 12/585,056, Apr. 19, 2012, 5 pgs.
Smith, Notice of Allowance, U.S. Appl. No. 12/396,447, Jun. 5, 2012, 7 pgs.
Candell, Office Action, U.S. Appl. No. 12/692,789, Sep. 21, 2012, 10 pgs.
Fleeter, Office Action, U.S. Appl. No. 10/992,173, Oct. 17, 2012, 17 pgs.
Candell, Notice of Allowance, U.S. Appl. No. 12/692,789, May 10, 2013, 6 pgs.
Fleeter, Notice of Allowance, U.S. Appl. No. 13/422,195, Apr. 23, 2013, 9 pgs.
Fleeter, Office Action, U.S. Appl. No. 13/422,173, May 20, 2013, 21 pgs.
Fleeter, Office Action, U.S. Appl. No. 13/422,195, Dec. 6, 2012, 17 pgs.
Jordan, Office Action, U.S. Appl. No. 13/608,146, Jul. 17, 2013, 13 pgs.
McDermott, Notice of Allowance, U.S. Appl. No. 11/739,377, Jul. 19, 2013, 9 pgs.
Morana, Notice of Allowance, U.S. Appl. No. 12/585,056, Jul. 22, 2013, 6 pgs.
Morana, Office Action, U.S. Appl. No. 12/585,056, Apr. 24, 2013, 3 pgs.
Singleton, Final Office Action, U.S. Appl. No. 12/693,116, Aug. 1, 2013, 10 pgs.
Candell, Office Action, U.S. Appl. No. 12/692,789, Mar. 30, 2012, 8 pgs.
Larson, Space Mission Analysis and Design, Second Edition, Chapter 22, Design of Low-Cost Spacecraft, pp. 767-796, 1992.
McDermott, Specification and Drawings, U.S. Appl. No. 11/876,747, Oct. 22, 2007, 28 pgs.
Berthet, Synchronization Complexity for a Satellite Multimedia Burst Receiver, [date], 5 pgs, Nov. 28, 2008.
Evans, Satellite Communication Systems 3rd edition, Jan. 2009, cover page and p. 468.
Fleeter, Notice of Allowance and Fees Due, U.S. Appl. No. 10/054,175, Aug. 18, 2004, 7 pgs.
Fleeter, Office Action, U.S. Appl. No. 09/130,854, Nov. 22, 2000, 7 pgs.
Fleeter, Office Action, U.S. Appl. No. 10/992,173, Apr. 8, 2011, 14 pgs.
Fleeter, Final Office Action, U.S. Appl. No. 10/992,173, Oct. 12, 2011, 15 pgs.
Franke, Choosing the best hardware form-factor for the airborne domain of the Joint Tactical Terminal (JTT) and Joint Tactical Radio System (JTRS), Aug. 6, 2002, 8 pgs.
Handermann, Notice of Allowance and Fees Due, U.S. Appl. No. 11/685,936, Dec. 1, 2009, 6 pgs.
Handermann, Office Action, U.S. Appl. No. 11/685,936, Sep. 9, 2009, 22 pgs.
Handermann, Office Action, U.S. Appl. No. 11/685,936, Oct. 20, 2008, 16 pgs.
Handermann, Supplemental Notice of Allowability, U.S. Appl. No. 11/685,936, Dec. 15, 2009, 4 pgs.
Harms, The Orbcomm Experience, EMPS 2004, Sep. 2004, 6 pgs.
Holm, Why convert to a SAASM-based Global Positioning System?, Military Embedded Systems, Oct. 2005, 3 pgs.
International Search Report and Written Opinion, PCT/US2006/042524, Apr. 22, 2008, 13 pgs.
International Search Report and Written Opinion, PCT/US2006/049656, Feb. 21, 2008, 12 pgs.
International Search Report and Written Opinion, PCT/US2007/063986, Oct. 26, 2007, 12 pgs.
Jordan, Final Office Action, U.S. Appl. No. 11/936,784, Nov. 7, 2011, 16 pgs.
Jordan, Office Action, U.S. Appl. No. 11/936,784, Aug. 27, 2010, 12 pgs.
McDermott, Notice of Allowance and Fees Due, U.S. Appl. No. 11/739,377, Dec. 14, 2011, 7 pgs.
McDermott, Notice of Allowance and Fees Due, U.S. Appl. No. 09/513,962, Sep. 9, 2005, 4 pgs.
McDermott, Notice of Allowance and Fees Due, U.S. Appl. No. 10/208,882, Apr. 10, 2007, 8 pgs.
McDermott, Notice of Allowance and Fees Due, U.S. Appl. No. 11/876,747, Jun. 3, 2009, 7 pgs.
McDermott, Office Action, U.S. Appl. No. 09/513,962, Sep. 14, 2004, 6 pgs.
McDermott, Final Office Action, U.S. Appl. No. 09/513,962, Apr. 16, 2004, 10 pgs.
McDermott, Office Action, U.S. Appl. No. 09/513,962, Jun. 24, 2003, 10 pgs.
McDermott, Final Office Action, U.S. Appl. No. 09/513,962, May 27, 2005, 9 pgs.
McDermott, Office Action, U.S. Appl. No. 11/739,377, Aug. 23, 2011, 17 pgs.
McDermott, Office Action, U.S. Appl. No. 11/876,747, Nov. 28, 2008, 5 pgs.
McDermott, Office Action, U.S. Appl. No. 10/208,882, Jan. 3, 2007, 11 pgs.
Meyers, Notice of Allowance and Fees Due, U.S. Appl. No. 11/592,008, Aug. 26, 2010, 10 pgs.
Meyers, Office Action, U.S. Appl. No. 11/592,008, Feb. 3, 2010, 24 pgs.
Meyers, Office Action, U.S. Appl. No. 11/592,008, Aug. 15, 2008, 18 pgs.
Meyers, Office Action, U.S. Appl. No. 11/592,008, May 18, 2010, 25 pgs.
Meyers, Office Action, U.S. Appl. No. 11/592,008, Mar. 19, 2009, 25 pgs.
Meyers, Office Action, U.S. Appl. No. 11/592,008, Sep. 21, 2009, 24 pgs.
Morana, Notice of Allowance and Fees Due, U.S. Appl. No. 11/618,379, May 13, 2009, 4 pgs.
Morana, Office Action, U.S. Appl. No. 11/618,379, Jan. 6, 2009, 7 pgs.
Morana, Office Action, U.S. Appl. No. 12/585,056, Oct. 13, 2011, 8 pgs.
Morana, Office Action, U.S. Appl. No. 29/270,057, Feb. 26, 2009, 5 pgs.
Ormesher, Current Radar Responsive Tag Development Activities at Sandia National Laboratories, Proc. of SPIE vol. 5410, 2004, 7 pgs.
Skiscim, Notice of Allowance and Fees Due, U.S. Appl. No. 12/101,391, Jul. 22, 2011, 18 pgs.
Skiscim, Office Action, U.S. Appl. No. 12/101,391, Jan. 4, 2011, 14 pgs.
Smith, Office Action, U.S. Appl. No. 12/396,447, Dec. 5, 2011, 31 pgs.
Stafford, Notice of Allowance and Fees Due, U.S. Appl. No. 11/681,759, Aug. 13, 2008, 7 pgs.
Stafford, Notice of Allowance and Fees Due, U.S. Appl. No. 11/937,826, Jul. 29, 2011, 8 pgs.
Stafford, Final Office Action, U.S. Appl. No. 11/681,759, May 20, 2008, 8 pgs.
Stafford, Office Action, U.S. Appl. No. 11/681,759, Dec. 21, 2007, 7pgs.
Stafford, Office Action, U.S. Appl. No. 11/937,826, Sep. 16, 2010, 5 pgs.
Summers, Plug and play testbed to enable responsive space missions, IEEE paper #1221, Mar. 5-12, 2005, 8 pgs.
Zenick Jr., Notice of Allowance and Issue Fee Due, U.S. Appl. No. 09/045,970, Sep. 24, 2001, 2 pgs.
Zenick Jr., Office Action, U.S. Appl. No. 09/045,970, Apr. 10, 2001, 4 pgs.
Zenick Jr., Office Action, U.S. Appl. No. 09/045,970, Oct. 25, 2001, 3 pgs.

\* cited by examiner

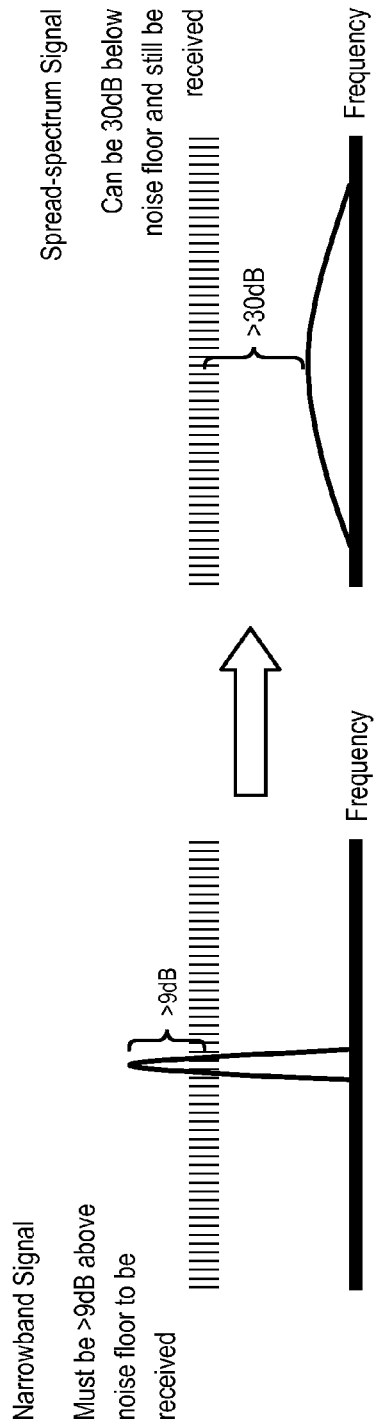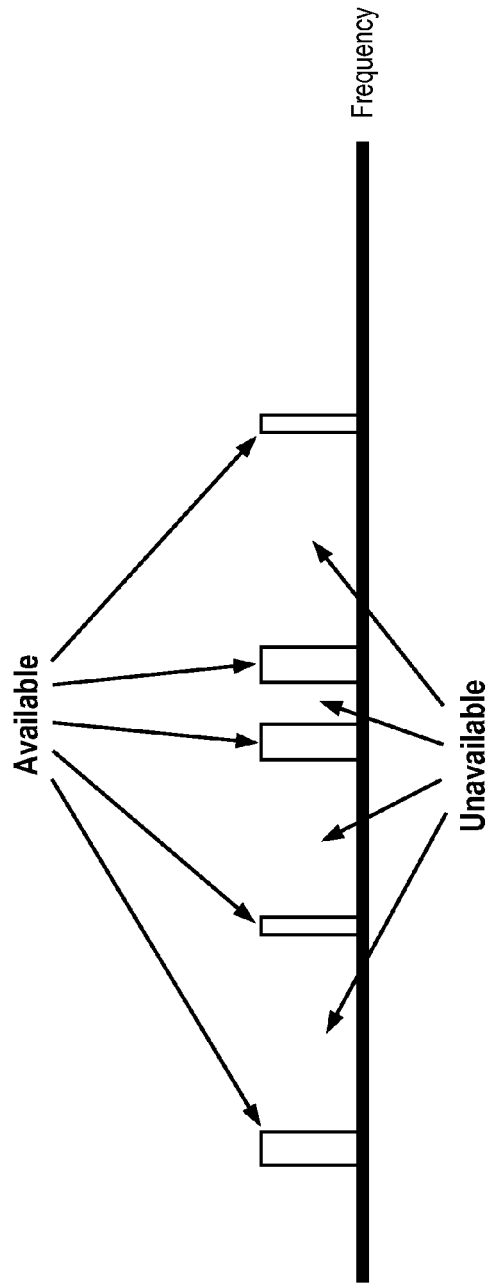
Figure 2A
Figure 2B

SYSTEM AND METHODS FOR DYNAMIC SPREAD SPECTRUM USAGE

RELATED CASES

This application claims priority to U.S. Provisional Patent Application Ser. No. 61/246,063 filed Sep. 25, 2009, which is incorporated herein by reference in its entirety.

TECHNICAL FIELD

The disclosed embodiments relate generally to communications. More particularly, the disclosed embodiments relate to transmission of spread spectrum signals.

BACKGROUND

In order to perform many modern communication functions, devices must have appropriate bandwidth that permits the transmission of signals. However, large blocks of contiguous bandwidth that are available for use are increasingly rare and thus may be very expensive to use or may be unavailable. Bandwidth owners (e.g., bent-pipe satellite operators), however, often have portions of bandwidth that are unutilized or underutilized. Those same bandwidth owners have portions of bandwidth that are currently utilized, but which can also support a "below the noise" low data rate system as an added functionality. In both of these cases, however, the bandwidth in question may be highly fragmented (e.g., separated into relatively small portions of spectrum), may change with time or geographic location, and may have different background noise levels and signal transmission requirements.

SUMMARY

Thus, it would be desirable to have a "below the noise" system that can take advantage of fragmented bandwidth and bandwidth that is only available for use "below the noise" by fitting itself into the discrete bandwidth intervals of spectrum that happen to be available. Moreover, in many common applications there are a large number of transmitters that transmit to one or a few central locations thus it is advantageous to find approaches that allow the transmitters to be relatively straightforward (and therefore have a low production cost) compared to the receivers and any central processing unit, which can be complex, because they are few in number.

In accordance with some embodiments, a transmitter for transmitting a signal to a receiver using spread spectrum signals is configured to: generate a respective signal; and separate the respective signal into multiple predefined portions. Each predefined portion is below a noise floor. The transmitter is further configured to transmit at least a plurality of the predefined portions of the respective signal at discrete bandwidth intervals in accordance with a spread spectrum signal splitting technique. The discrete bandwidth intervals are portions of spectrum that are available for transmission.

In accordance with some embodiments, a receiver for reconstructing a signal from a transmitter from a plurality of spread spectrum signals is configured to: receive multiple predefined portions of a respective signal at discrete bandwidth intervals. Each predefined portion is below a noise floor. The receiver is further configured to reconstruct the respective signal using at least a plurality of the predefined portions in accordance with a spread spectrum signal splitting technique.

In some embodiments, the transmitter for transmitting signals uses a spread spectrum signal splitting technique including: generating a respective signal and separating the respective signal into multiple of bits for transmission at one of the discrete bandwidth intervals that are available for transmission. A plurality of the bits have a predefined width that corresponds to a minimum amount of spectrum required to transmit the bit in a predefined duration. The spread spectrum signal splitting technique further includes transmitting the plurality of bits in the discrete bandwidth intervals such that the transmission is below the noise floor.

In some embodiments, the transmitter for transmitting signals uses a spread spectrum signal splitting technique including: generating a respective signal and separating the respective signal into multiple bits for transmission at the discrete bandwidth intervals that are available for transmission. A plurality of the bits each have a predefined width that is determined based on a width of one of the discrete bandwidth intervals. The spread spectrum signal splitting technique further includes transmitting the plurality of bits in the discrete bandwidth intervals. The plurality of bits are each transmitted for a duration that is determined based on a predefined width of the bit, such that the transmission is below the noise floor.

In some embodiments, the transmitter for transmitting signals uses a spread spectrum signal splitting technique including: generating a respective signal and in a frequency domain, dividing the respective signal into a plurality of signal pieces. A plurality of the signal pieces each have a piece width less than or equal to a respective spectrum width of a corresponding discrete bandwidth interval that is available for transmission. The spread spectrum signal technique further includes transmitting each of the plurality of the signal pieces at a corresponding discrete bandwidth interval such that the transmission is below the noise floor.

Thus, the disclosed transmitters, receivers, and spread spectrum signal splitting techniques provide improvements over conventional approaches by improving the utilization of available bandwidth and reducing the cost of transmitters.

BRIEF DESCRIPTION OF THE DRAWINGS

FIG. 2A is timing diagram illustrating a spread spectrum signal in accordance with some embodiments.

FIG. 2B is a timing diagram illustrating available spectrum in accordance with some embodiments.

Like reference numerals refer to corresponding parts throughout the drawings.

DESCRIPTION OF EMBODIMENTS

Figure 1A:
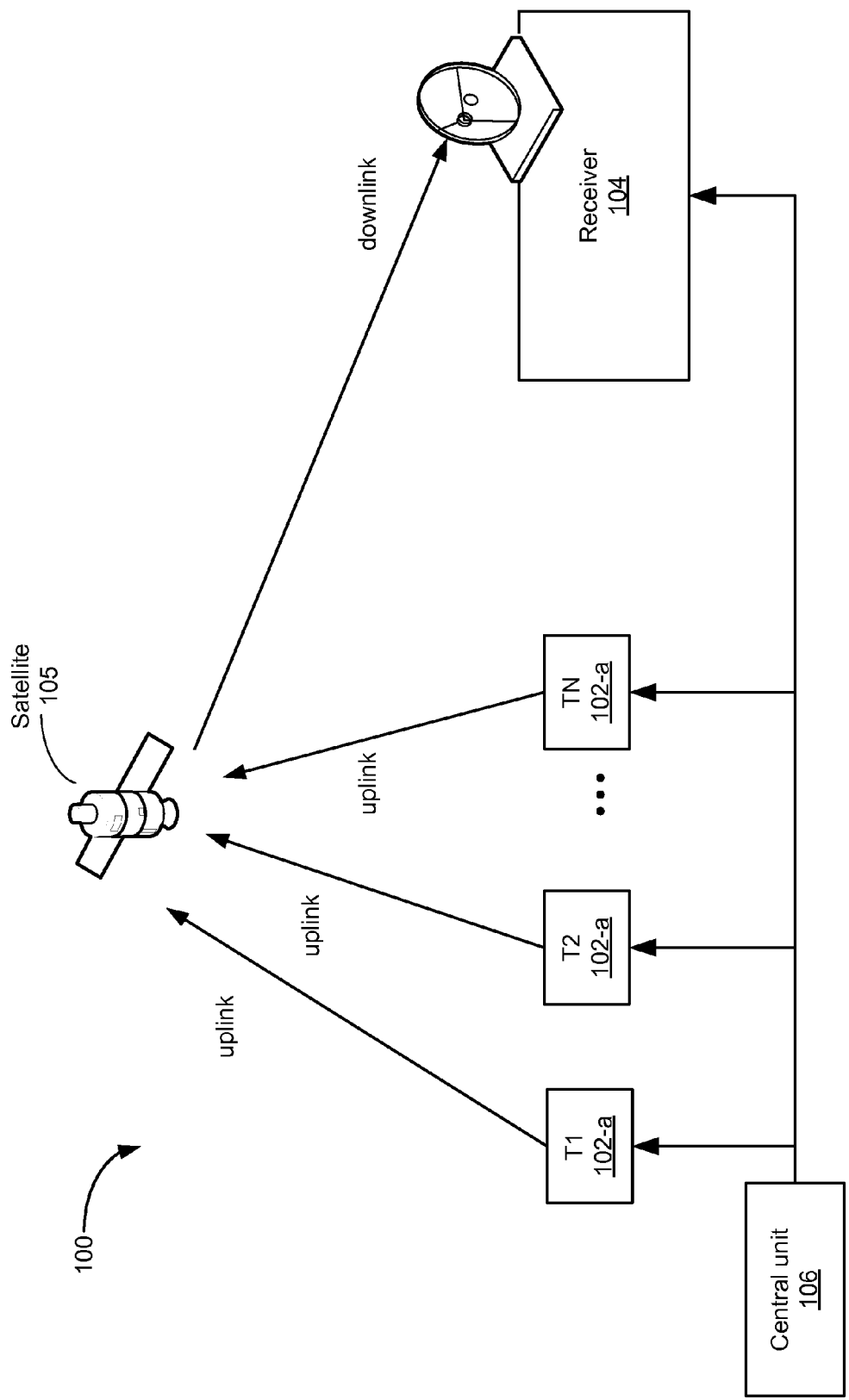
FIG. 1A is an exemplary block diagram of a communication system in accordance with some embodiments.

As shown in FIG. 1A, in a "many-to-one" system, many transmitters 102 (e.g., T1, T2 . . . TN) relay small portions (e.g., bits of pieces of a larger spread spectrum signal) of data to a central receiver 104 (e.g., receiver) via a satellite. For example, the small portions of data are transmitted from one of the transmitters 102 to a satellite 105 via satellite uplink and transmitted by the satellite to the receiver 104 via a satellite downlink, as illustrated in FIG. 1A. The receiver is able to distinguish between the many transmitter by code phase. In some embodiments a central unit 106 provides the transmitters 102 with information enabling a spread spectrum signal to be separated into multiple predefined portions and provides the receiver 104 with information enabling the spread spectrum signal to be reconstructed. In some embodiments, the central unit 106 also synchronizes timing of the transmitters 102 and the receiver(s) 104.

Figure 1C:
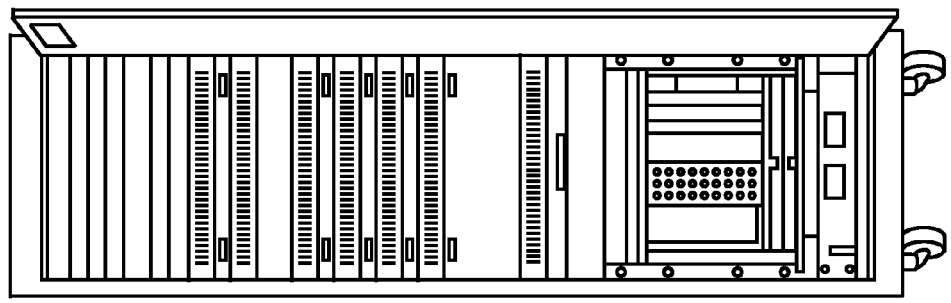
FIG. 1C is an exemplary central receiver in accordance with some embodiments.
Figure 1B:
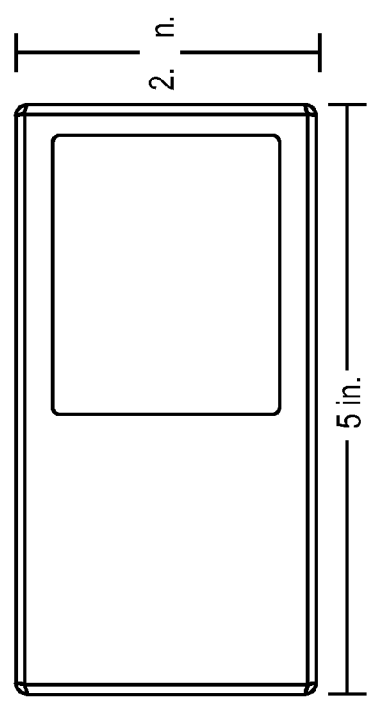
FIG. 1B is an exemplary transmitter in accordance with some embodiments.
Figure 4:
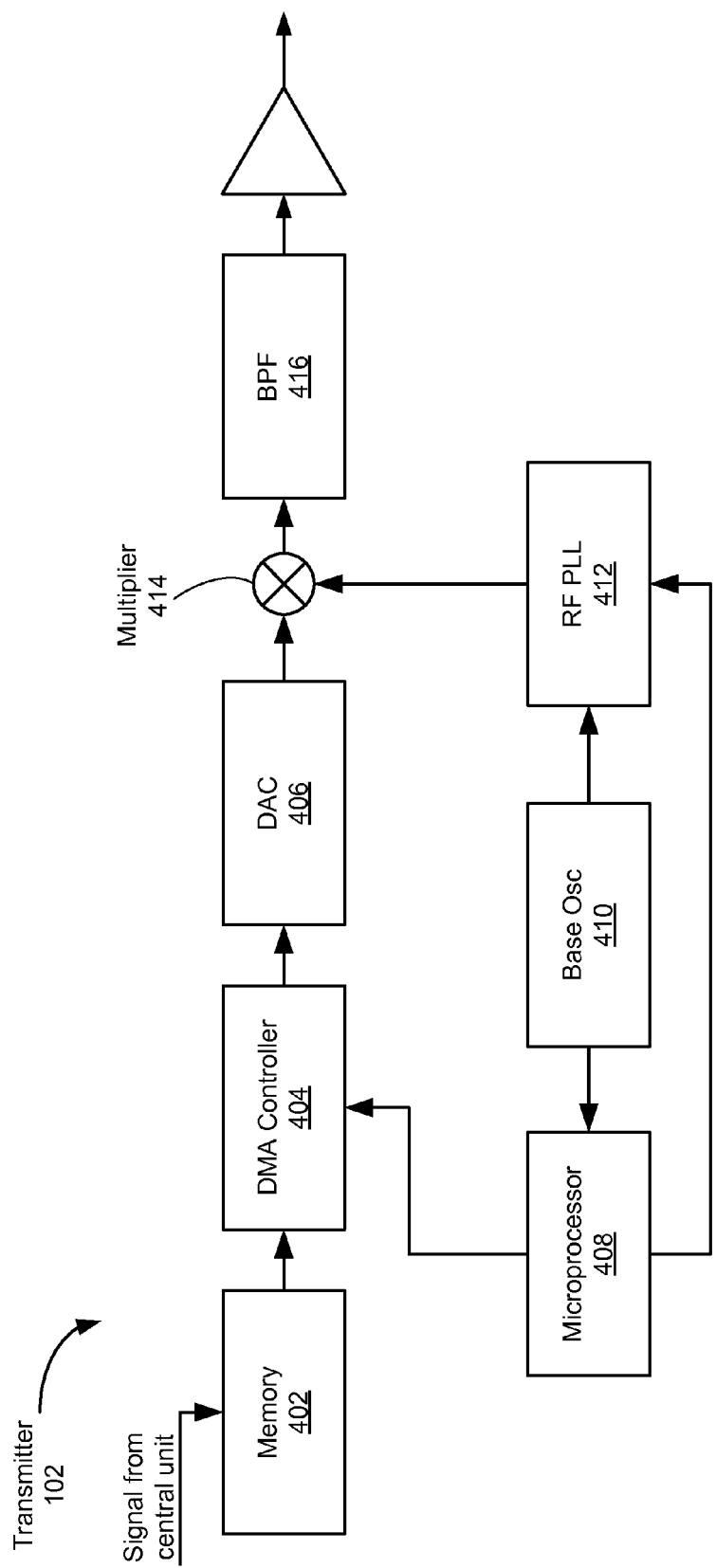
FIG. 4 is a block diagram illustrating a transmitter in accordance with some embodiments.

An exemplary illustration of a transmitter is shown in FIG. 1B. A block diagram illustrating a transmitter in accordance with some embodiments is illustrated in FIG. 4. In some embodiments, the transmitters 102 are designed to use as few resources as possible in order to maintain minimal power, minimal size, and maximal lifetime from small battery pack.

The transmitter's simplicity is compensated for at the central receiver. An exemplary illustration of a central receiver is shown in FIG. 1C. The central receiver deals with overlapping messages, transmitter frequency variation, and error correction. In some embodiments, a single 8-channel receiver supports over 1.5 million remote devices, each transmitting twice per day. The 1.5 million remote device figure is derived from 1.05 s transmission (128 b at 122 bps), 8 geographically independent channels with 50-overlapping capacity; 18.44% Aloha optimal occupation, 2 packet slots occupied per packet transmission (due to repeats), 2 transmissions per day. This is a soft limit; peak capacity is greater by up to a factor of 5. This soft limit comes from the fact that the 18.44% Aloha occupation is an optimal, not maximal, amount, and the presumption of ⅔ of repeated messages being successfully demodulated can erode down to ⅓ (the increased losses now due to collisions) and users will still get most of their messages. More receivers 104 in the network means more capacity for the system 100.

In some embodiments, all communications use Direct-Sequence Spread Spectrum (DSSS) in order to transmit signals below the noise floor (e.g., the transmitted signal is substantially indistinguishable from white noise for receivers other than the receivers 104 that are coordinated with the transmitters 102). Spread spectrum techniques are used to modulate an information signal such that the modulated signal appears as noise. The information is modulated by a pseudo-random signal, and can be demodulated, or despread, by the same pseudo-random sequence. This modulation is commonly referred to as Direct-Sequence Spread Spectrum (DSSS). The modulated signal is spread across a bandwidth that is substantially larger than the bandwidth of the information signal, and has the apparent effect of increasing the noise floor of receivers that receive this signal. Applying the same pseudo-random sequence to the modulated signal allows the information signal to be detected within this apparent noise.

Thus, an original signal to be transmitted by a transmitter is transformed into a modulated signal (e.g., a spread spectrum signal) by multiplying the original signal by a pseudo-random sequence. As shown in FIG. 2A, the modulated signal is spread across a bandwidth that is substantially larger than the bandwidth of the information signal, and has the apparent effect of increasing the noise floor of receivers that receive this signal. Applying the same pseudo-random sequence to the modulated signal allows the information signal to be detected within this apparent noise by a receiver 104. It should be noted that the numbers used in FIG. 2A are examples. Those skilled in the art will recognize that systems exhibiting different characteristics can be used.

It should be understood that this signal may be virtually any type of signal. In some embodiments, the signal indicates a geographical location of the transmitter. For example, the signal may be coordinates determined using a global positioning system (GPS) receiver or other type of location detection hardware/software. In some embodiments, the signal may include an indicator of a state of the transmitter, such as: an indication of the operational status of the indicator (e.g., fully operation, low battery, damaged circuitry, etc.), and/or an indication of a movement status of the indicator, etc.

In accordance with one embodiment, transmission of the spread spectrum signal raises the noise floor by ≤0.1%. This estimation of the noise floor is based on the following assumptions: a 1023-chip code, repeated 8 times per information bit, for an effective spreading ratio of 8184:1, or 39.13 dB. In this example, at the peak of the spread curve, assuming a 9 dB absolute-minimum Eb/No, the impact on the noise floor is −30 dB, or 0.1%, and the average impact across the entire spread curve is −34 dB, or 0.0398%. Consequently, in this example, transmitters will thus raise the noise floor an average of 1.99%. It should be noted that, in this embodiment, all of these ratios apply independent of the actual spreading or information bit rates. For discrete bandwidth intervals, which have a very unsteady noise floor due to dynamic usage, DSSS can accommodate up to 10 dB of fluctuation and still raise the noise floor by <1% or can accommodate 50 overlapping transmissions while raising the noise floor an average of <2%. It should be understood that typical non-spread spectrum signals are 5 to 20 Db above the noise floor. Strictly speaking, a repeated code will not be a single smooth curve, but a series of spectral lines. However, practical experience with these systems shows that the behavior is as shown here, in that it is dependent wholly on the spreading ratio, and acts to other spectrum users like a smooth curve.

Code Phase Division Multiple Access (CPDMA) techniques allow a plurality of transmitters to use the same spread code and center frequency. The receiver is capable of distinguishing among overlapping transmissions because the transmitters are uncoordinated, and thus, start transmitting their spreading codes at different times. As a result, the spreading codes are offset from one another. The receiver searches all possible code phases and all possible transmitter frequency offsets simultaneously. This arrangement is advantageous in situations where the transmitters are desired to be as simple and power efficient as possible, while receivers are not constrained by simplicity or power consumption concerns (e.g., the computationally intensive operations are offloaded onto the receiver, so as to enable the transmitters to be simplified).

As shown in FIG. 2B, bandwidth may be "available" or "unavailable" for transmission at any given frequency or frequency range (e.g., a discrete bandwidth interval). Bandwidth owners often have portions of bandwidth that are unutilized or underutilized. Further, even if the bandwidth is utilized, it may also support a "below the noise" approach as an added function. All three of these cases result in "available" bandwidth (e.g., unused bandwidth, underutilized bandwidth, and below-the-noise bandwidth). In these cases, however, the bandwidth available to transmit the spread-spectrum signal may be separated into several or many relatively small portions of spectrum, may change with time or geographic location, and may have different background noise levels.

Figure 2C:
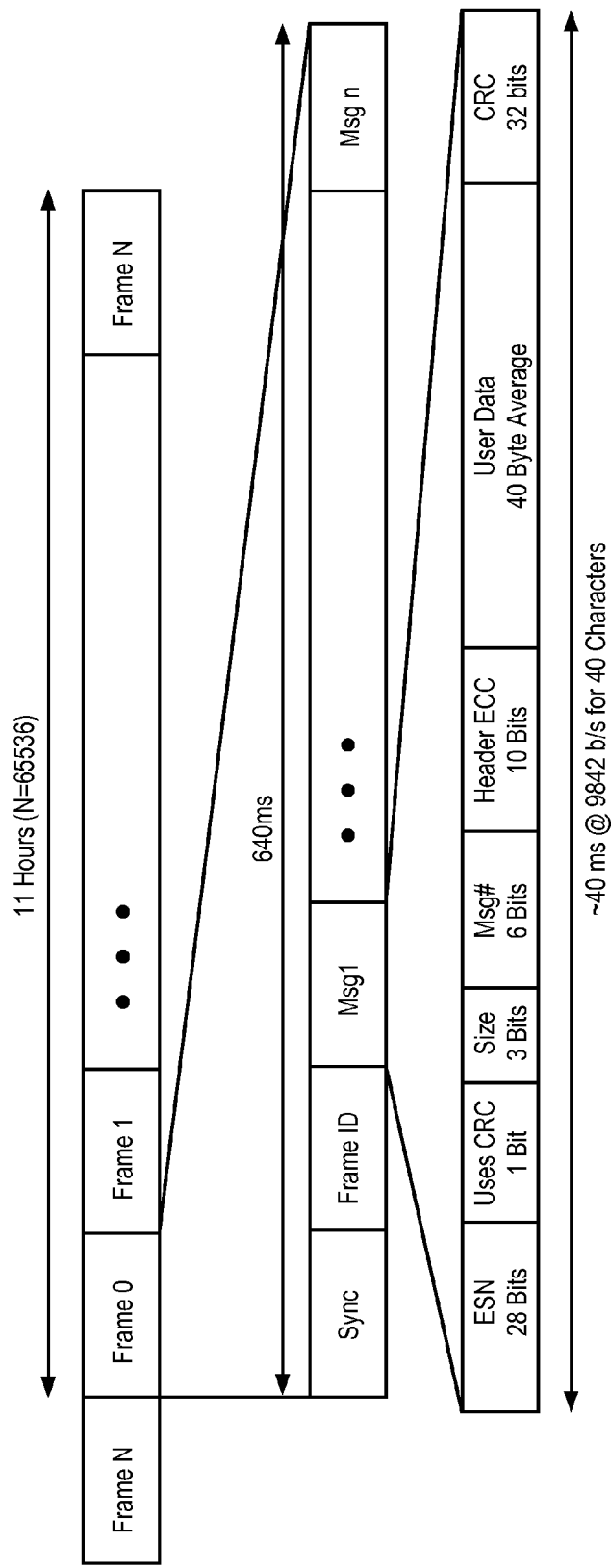
FIG. 2C is a block diagram of an outbound data stream in accordance with some embodiments

Returning to FIG. 1A, in some embodiments, a central data warehouse computer (e.g., central unit 106) identifies discrete bandwidth intervals that are available for a zone (e.g., a geographic region) and conveys signal processing information to the transmitters that enables the transmitters 102 to separate a spread spectrum signal into multiple predefined portions and transmit the spread spectrum signal via the discrete bandwidth intervals. In some embodiments, the central unit 106 and the transmitters 102 are connected via a wireless link. The central unit 106 (FIG. 1A) is informed of the discrete bandwidth interval changes or desired changes in how the discrete bandwidth intervals are used (e.g., by an operator of the system). The central unit 106 can then create the optimal samples to shape the intended spread-spectrum signal. The central unit 106 also informs the receiver 104 of the update and its effective time. The receiver 104 listens to the outbound data stream of the central unit 106 at a regular interval known to both the receiver 104 and the central unit 106. The data stream of the central unit 106 is illustrated in FIG. 2C. For highly bidirectional applications, for example, the interval is frequent (e.g., every ½ second). For applications that need long battery life, on the other hand, the interval is relatively long (e.g., every ½ day). In some embodiments, the central unit 106 and the receiver 104 are connected via a wireless link. All of the transmitters 102 receive messages from the central unit 106 to update the respective waveforms. The message is a set of instructions for creating the samples and includes an absolute time to perform the switch so that all of the transmitters 102 switch at the same moment. In some embodiments, the outbound data stream is also below the noise of the primary system users.

As disclosed below, several techniques (e.g., discrete occupation, tailored occupation, and spectral distribution) can be implemented in order to fit the spread-spectrum signal to the available discrete bandwidth intervals. What discrete bandwidth interval receives what portion of the spread spectrum source signal can be chosen based on the primary use of that discrete bandwidth interval. Accordingly, underused discrete bandwidth intervals, even narrow ones, can be put to good use.

Discrete Occupation

In some embodiments, some predefined minimum amount of spectrum (e.g., 16 kHz) is used to convey only one bit of the spread spectrum signal, as described in greater detail below with reference to FIG. 8. If 32 kHz are available, two bits are sent "side by side" in spectrum. In other words, in this approach, the waveforms used to transmit signals are not adjusted for larger discrete bandwidth intervals, rather in a larger discrete bandwidth interval, multiple waveforms are transmitted with different center frequencies. It should be noted that 16 kHz is used as the minimum amount of spectrum for discussion purposes only. One skilled in the art would recognize that the minimum amount of spectrum available could be equal to any bandwidth.

In other words, individual portions of a data packet are sent at different center frequencies. In some embodiments, a single bit is sent per center frequency. It should be noted that, in some embodiments, adjacent center frequencies are held in a common phase to allow tighter frequency packing, while in other embodiments, adjacent center frequencies are not specifically held in common phase.

With 16 kHz of spectrum and one bit to send, that one bit could be sent in $\frac{1}{16,000}$ of a second (62.5 μs). To then be received, however, this bit would have to be transmitted with enough energy to have it visible above the noise floor. In order to keep the transmission of one bit below the noise floor, Direct Sequence Spread Spectrum (DSSS) is applied so that the 16 kHz is filled with spreading energy but only one bit of actual information is sent. How far below the noise floor that the spread spectrum signal is transmitted is determined by the spreading ratio, which is the ratio between the spreading rate (i.e., one-half of the available spectrum, or 8 kHz in this example) and the actual information bit rate. If the receiver needs, for example, 9 dB of signal-to-noise ratio in a bit in order to correctly decode the bit, then 9-10 log 10(8000/bitrate) is how far below the noise the spread spectrum signal will end up in dB. Assuming a bitrate of one bit per second, then the transmitted signal will be (at maximum) 30 dB below the noise floor, and thus, invisible to other users of the spectrum. In other words, the signal is sent at a lower power for a longer period of time and thus is detectable by a receiver that is looking for the signal, but is not detectable by a receiver that is not looking for the signal, because the power is below the noise floor for a typical receiver.

This approach allows the use of a third method of multiple-access: CPDMA, which allows transmitters to operate independently of one another, with no synchronization, assignment of separate access windows (in time, frequency, code, or otherwise), or network coordination needed. As stated above, all transmitters use the same spreading code, and the fact that they start their transmissions at random relative times means that it is unlikely that any two will start their spreading code transmission at the same moment. This offset, in conjunction with the use of a Maximal Length (ML) spreading code, means that the two transmissions are distinguishable.

This attribute of "all transmitters use the same spreading code" is one aspect of a larger design advantage, which is that all transmitters can be created to be identical at manufacture. They are, in essence, transmitters capable of transmitting at a relatively high data rate (e.g., 30 MHz wide), but that emit a waveform wherein only the selected 16 kHz discrete bandwidth intervals have energy. The transmitters are told, either at manufacture or at provisioning or at some other moment appropriate to the host system, which discrete bandwidth intervals to use, how wide they are, what spreading code(s) to use (the presumption is for each 16 kHz-wide 'bit' to have the same spreading code, but they can use different ones if it makes sense on the host system), and what the bit rate is. From this information, the transmitter, which is presumably a digital logic device sending samples at relatively high rate (say, 70 MSps) to a Digital-to-Analog converter for transmission, can create precisely the waveform necessary to accomplish the discrete occupation distribution of bits. That is, one mass-manufactured piece of hardware can take advantage of any width, distribution, relative characteristics, below-the-noise requirements, and quantity of available sections of bandwidth. It can then change, with no more effort than the update of these parameters, to accommodate a different set of available discrete bandwidth intervals, as they become available because the transmitter moved or the host system's circumstances changed.

This brings us in turn to the advantage of using one bit per discrete bandwidth interval. This approach "squeezes" the information out in frequency, instead of in time. This is good because the amount of frequency available is fixed, and sensibly one would wish to make maximal use of it. A system that always occupies as much spare bandwidth as a host system has available is a system that does not need to worry about which transmitters to assign to frequency set A vs. frequency set B (where A+B is the total spare bandwidth), and is a system where all the transmitters function identically such that their behavior can be tightly controlled (e.g., by avoiding the need for requirements such as setting frequency B transmitters to a lower power than frequency A transmitters). In other words, in addition to all the transmitters being manufactured to be exact copies, they also behave in the field as exact copies, and any optimization or performance enhancement (e.g. optimizing the sample stream the transmitters send to their DACs) applies immediately and globally to all units. The transmitter is described further below in connection with FIG. 4.

This is of course not to say that only one bit per center frequency is allowed in discrete occupation; nor that they all are obliged to use the same set of frequencies or the same spreading code. Capacity enhancements in particular can benefit from adjusting any of these parameters, with the corresponding increase in receiver hardware to receive the new variations.

Tailored Occupation

As stated above, the discrete occupation approach puts, for example, 4 bits adjacent to one another in 64 kHz of space, sending its spreading code at each of four frequency centers with an available discrete bandwidth interval. In some other embodiments (herein referred to as tailored occupation), the discrete bandwidth intervals are used to determine the width of signals, and the duration of the signals is based on the width of the signals, as described in greater detail below with reference to FIG. 9. For example, using the tailored occupation method, a discrete bandwidth interval having a width of 64 kHz can be used to send a single spreading code with four bits sequenced in time, as described in greater detail below with reference to FIG. 9, instead of sending four bits "side by side" (e.g., using the discrete occupation approach described above). In other words, the spread spectrum signal is transmitted over 64 kHz all at once, and then 4 bits per second are sent. In other words, instead of transmitting four different bits at four different center frequencies in the 64 kHz discrete bandwidth interval over a period of 1 second, a single bit is transmitted at a single center frequency of the 64 kHz discrete bandwidth interval over a period of ¼ second. Thus, using the tailored occupation approach, four bits can be transmitted using the 64 kHz discrete bandwidth interval over a period of 1 second, however these four bits are sent sequentially (e.g., a first bit in the first ¼ second, a second bit in the second ¼ second, a third bit in the third ¼ second and a fourth bit in the fourth ¼ second). Thus, for discrete bandwidth intervals that are integer multiples of the minimum discrete bandwidth interval (e.g., 16 kHz), the discrete occupation and the tailored occupation techniques are identical in terms of below-the-noise and energy-per-bit behavior. Therefore, as described above, the advantages of all-identical-transmitters and the ability to distinguish transmitters by code phase are retained.

However, tailored occupation allows for the use of completely arbitrary available-spectrum widths, such that all of 15.442 kHz (for example) can be used in parallel with all of 98.155 kHz (for example), even though those numbers do not have anything to do with each other (as opposed to discrete occupation, which uses integer multiples of some single-bit occupation bandwidth). In other words, the signal width for each bit can be set to be equal to the entire discrete bandwidth interval, and the data rate for transmitting data can be adjusted to the desired level by adjusting the length of time for which the signals are sent (e.g., if the bandwidth of the signal is four times the minimum bandwidth, the length of time for which the signals are sent can be reduced to one quarter of the default time). While there are some advantages to tailored occupation, including full use of the available discrete bandwidth intervals, it should be understood that tailored occupation will typically result in increasing the complexity of the reconstruction of signals, as each spectrum portion has its own behavior.

Spectral Distribution

Figure 3A:
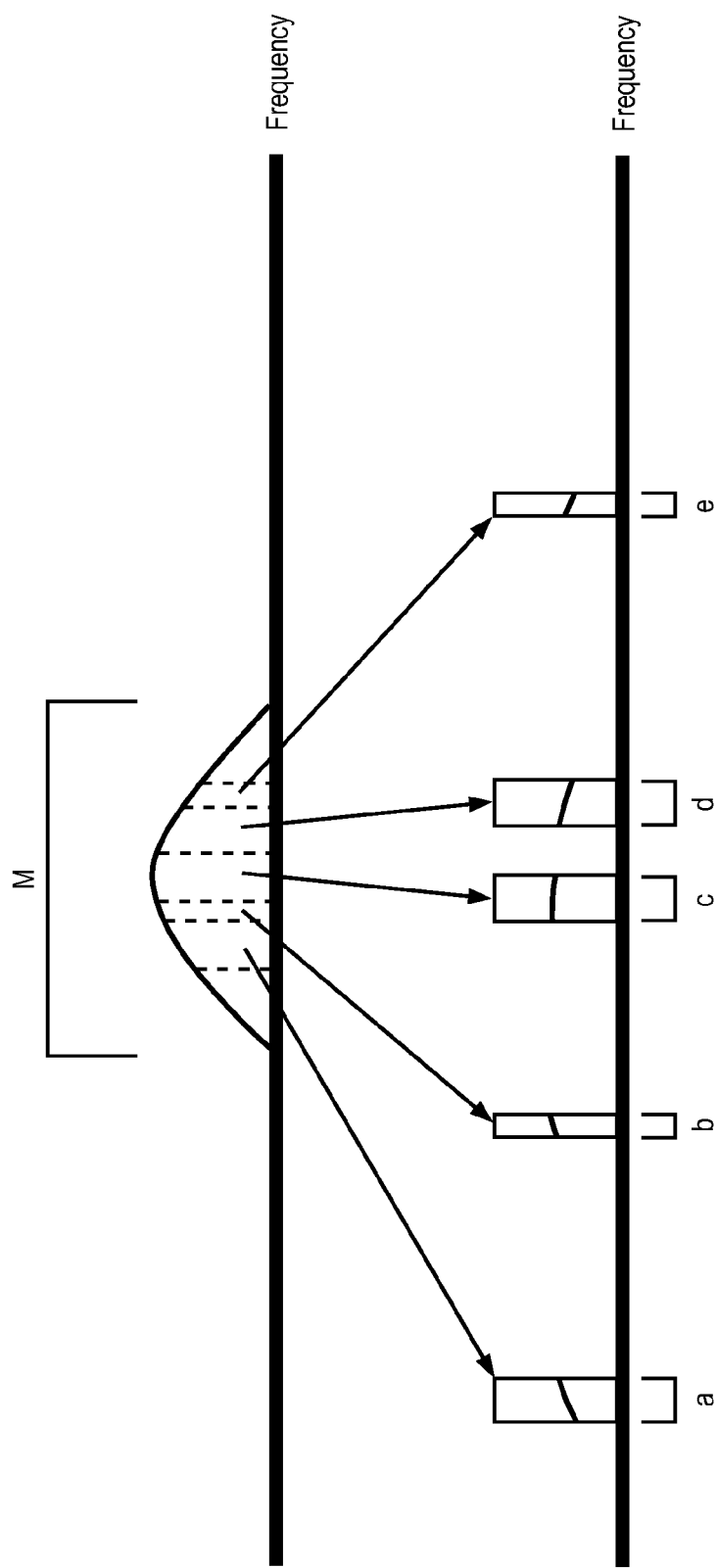
FIGS. 3A-H are timing diagrams of transmission signals in accordance with some embodiments.

In one embodiment, a single spread spectrum signal of some width is divided across the same width of available spectrum wherever the spectrum is available (e.g., in a plurality of discrete bandwidth intervals), as described in greater detail below with reference to FIG. 10. As shown in FIG. 3A, if the spread spectrum signal is M, and the spectrum is available in discrete bandwidth intervals equal to a, b, c, d, and e, the spectrum is simply divided up in the frequency domain to fill those available discrete bandwidth intervals. In some embodiments, only the central lobe of the spread spectrum signal is used as it contains the majority of the power for the spread spectrum signal. Because each system component (i.e., central unit, transmitter, and receiver) uses one master clock each, phase coherency is assured. In some embodiments, known (e.g., constant or constantly varying) phase or group delays can be accommodated at the receiver.

Figure 3B:
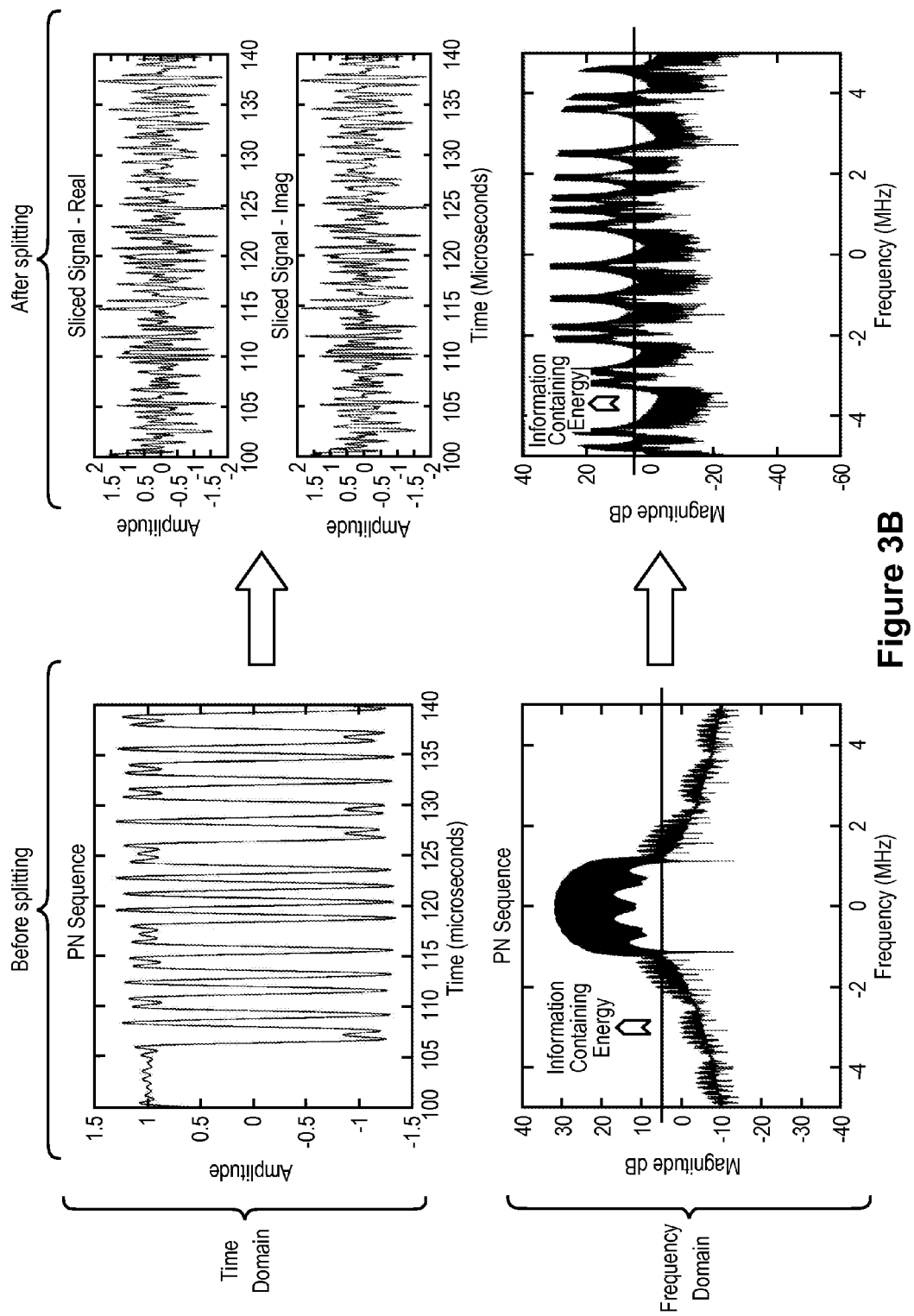

As shown in FIG. 3B, the time-domain result after splitting is, on the one hand, completely nonsensical to the eye; but on the other hand, the frequency domain result after splitting shows discrete bandwidth intervals where the spread-spectrum signal is transmitted at discrete intervals.

A single bit's worth of samples can be precomputed once, with extreme efficiency, by a central computer (e.g., central unit), and then programmed into the transmitters which then blindly use this stream of samples, rotating them in phase to modulate them (e.g., by using a phase shift keying approach such as binary phase shift keying to modulate the phase of a reference signal), but otherwise without the simple transmitters being aware of the spectral behavior they are ultimately displaying. This approach would display CPDMA behavior, that is, uncoordinated transmissions would still be distinguishable in code phase at the receive end following spectral reassembly.

The advantages of transmitters that are simple and straightforward, identically manufactured and behaving identically in the field, as discussed above in connection with the discrete occupation technique, still apply. Because the sample stream is handed to the transmitters as a fait accompli, with the transmitters unaware of the character of what they are transmitting, the original spread signal can be 2 MHz wide as in the example above, or 3.4 MHz, or 0.99 MHz, or whatever total amount of spectrum (e.g., which available discrete bandwidth intervals) the particular host system in that particular geographic region has to spare. It should be understood that, as stated above, these samples would typically be sent out to transmitters (at provisioning, or dynamically in the field) in a compressed form, not literally sample after sample. This compressed form is likely to be a "recipe" for the transmitter to create the desired waveform from simpler building blocks.

In one embodiment, direct sequence spread spectrum is employed in conjunction with binary phase shift keying. As one example, the information bit rate is at 100 bps; the period for one chip is 800 ns, corresponding to a chipping rate of 1.25

Figure 3C:
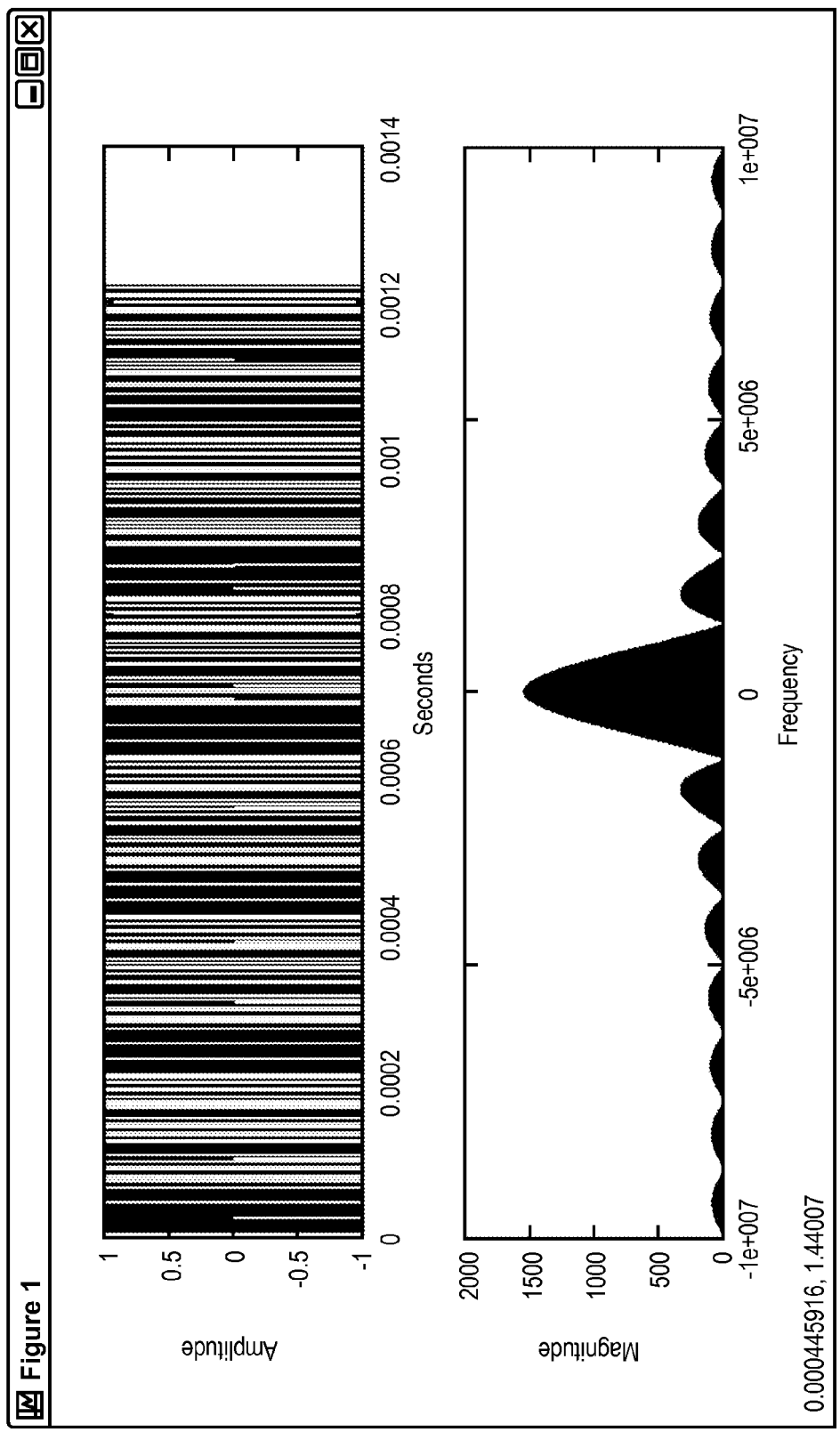
Figure 3D:
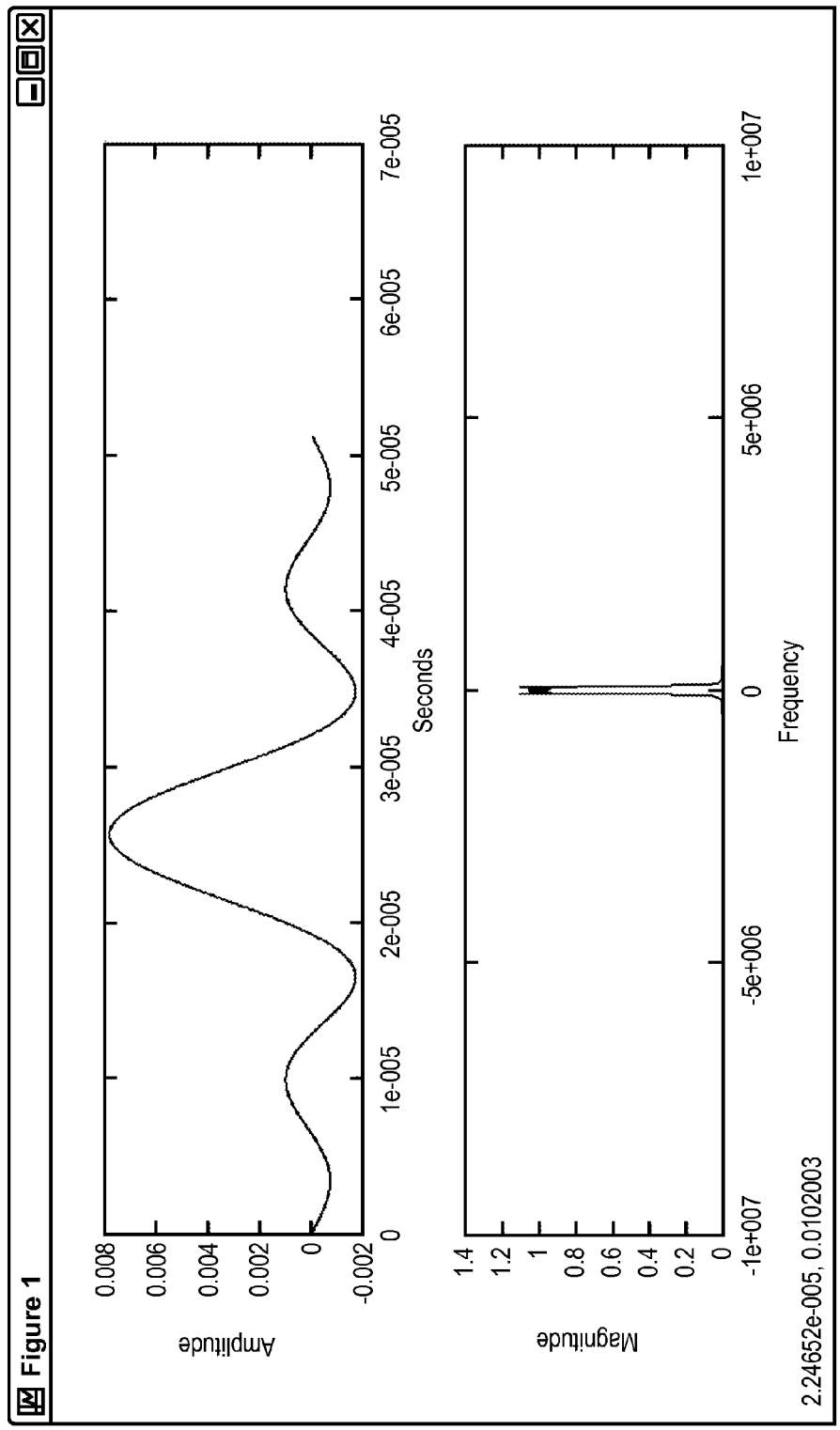

MHz. FIG. 3C shows the time and frequency domain for a 255-length PN signal repeated 6 times; and the distance from DC to the first null is at 1.25 MHz, as expected. For common forms of double sideband modulation, this results in a need of 2.5 MHz bandwidth. In some embodiments, a contiguous block of 2.5 MHz is not available/allowed, but 16 separate discrete bandwidth intervals of 156 kHz are available/allowed. Thus, it is possible to chop the 2.5 MHz signal into 16 chunks at the transmitter, transmit it to the receiver via the available discrete bandwidth intervals, and splice it back together at the receiver. For this example, a low-pass filter with a cutoff frequency of 78 kHz is used. The low pass filter is shown in FIG. 3D. It should be noted that this low-pass filter covers a frequency range of −78 kHz to +78 kHz allowing the 156 kHz bandwidth. For the sake of simplicity, this low-pass filter is merely a 1024-length rectangular window of the sinc function.

Figure 3E:
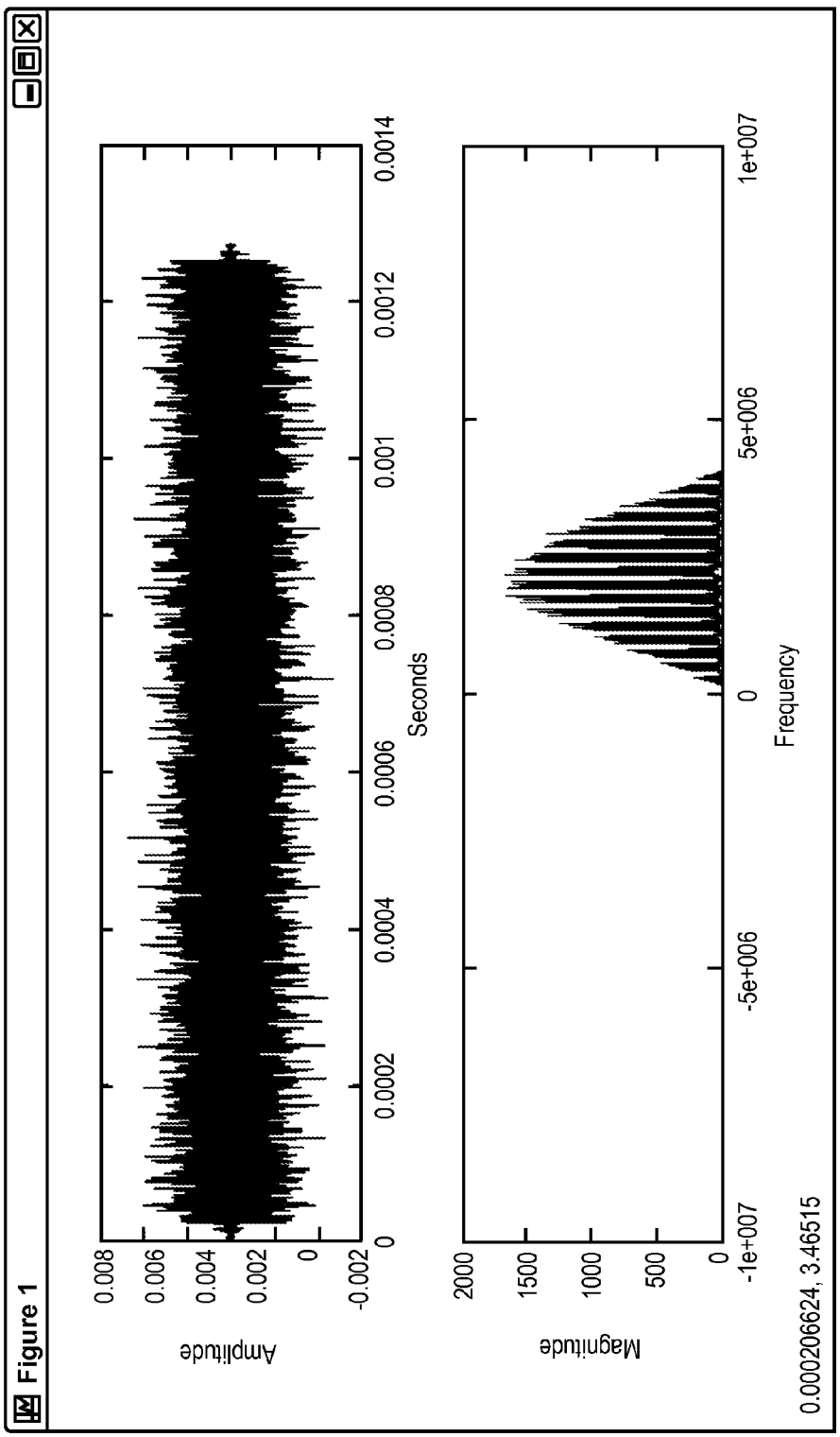

Continuing the example above, in order to implement the transmission, the 2.5 Mhz signal is complex mixed at spaces of 156 kHz, and then sent through the low pass filter. This creates 16 frequency-divided pieces of the original signal. Next each piece is complex mixed up to their desired discrete bandwidth interval. For simplicity, the frequency space of 250,000*n kHz, where n=1 to 16, is used. The resulting signal is shown in FIG. 3E. This signal can still be considered the "baseband" representation of the signal. Notice that the discrete bandwidth intervals range from 250 kHz to 4 MHz. From here, this signal needs to be modulated to L-band for the final transmission.

Figure 3F:
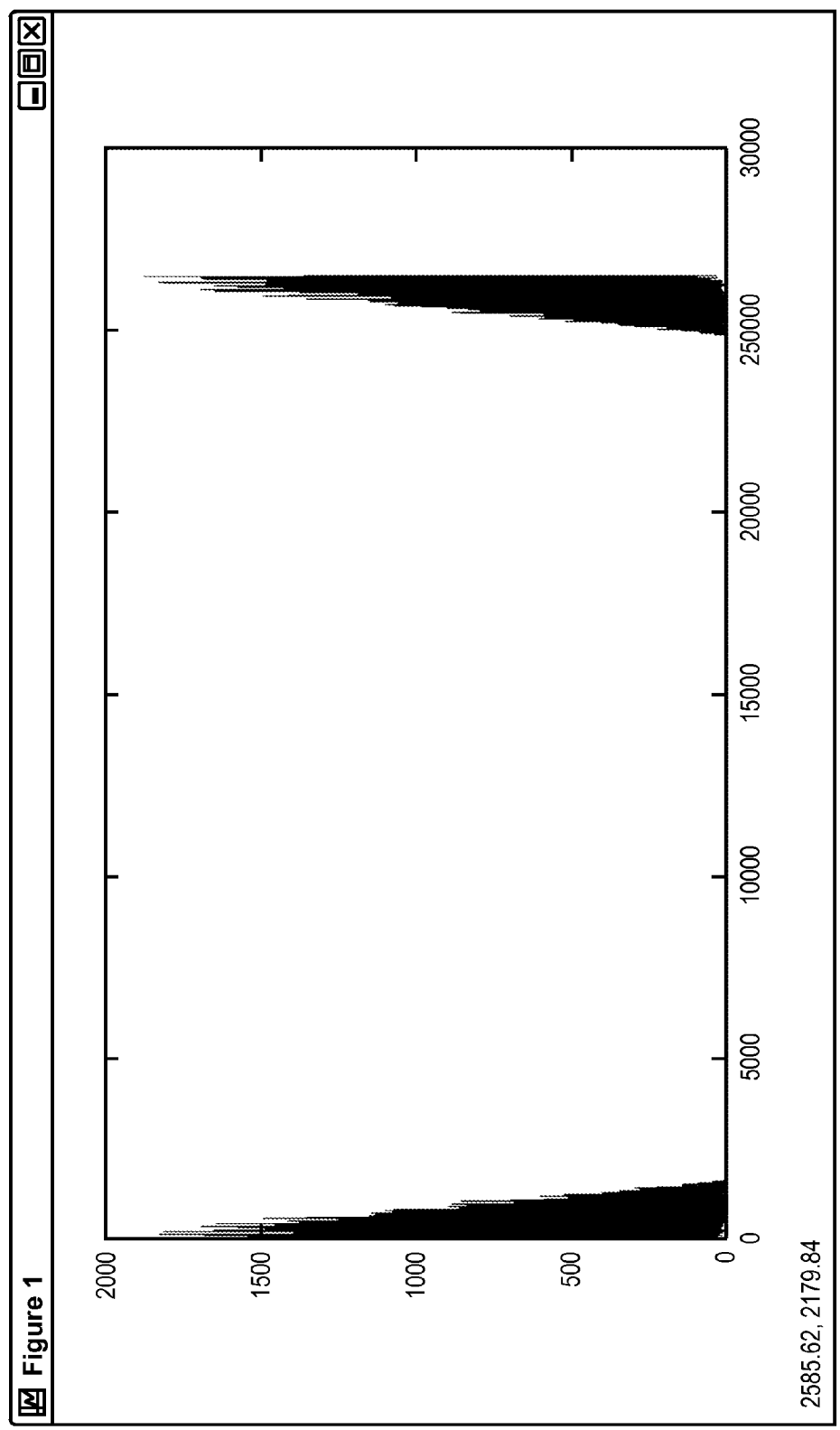
Figure 3G:
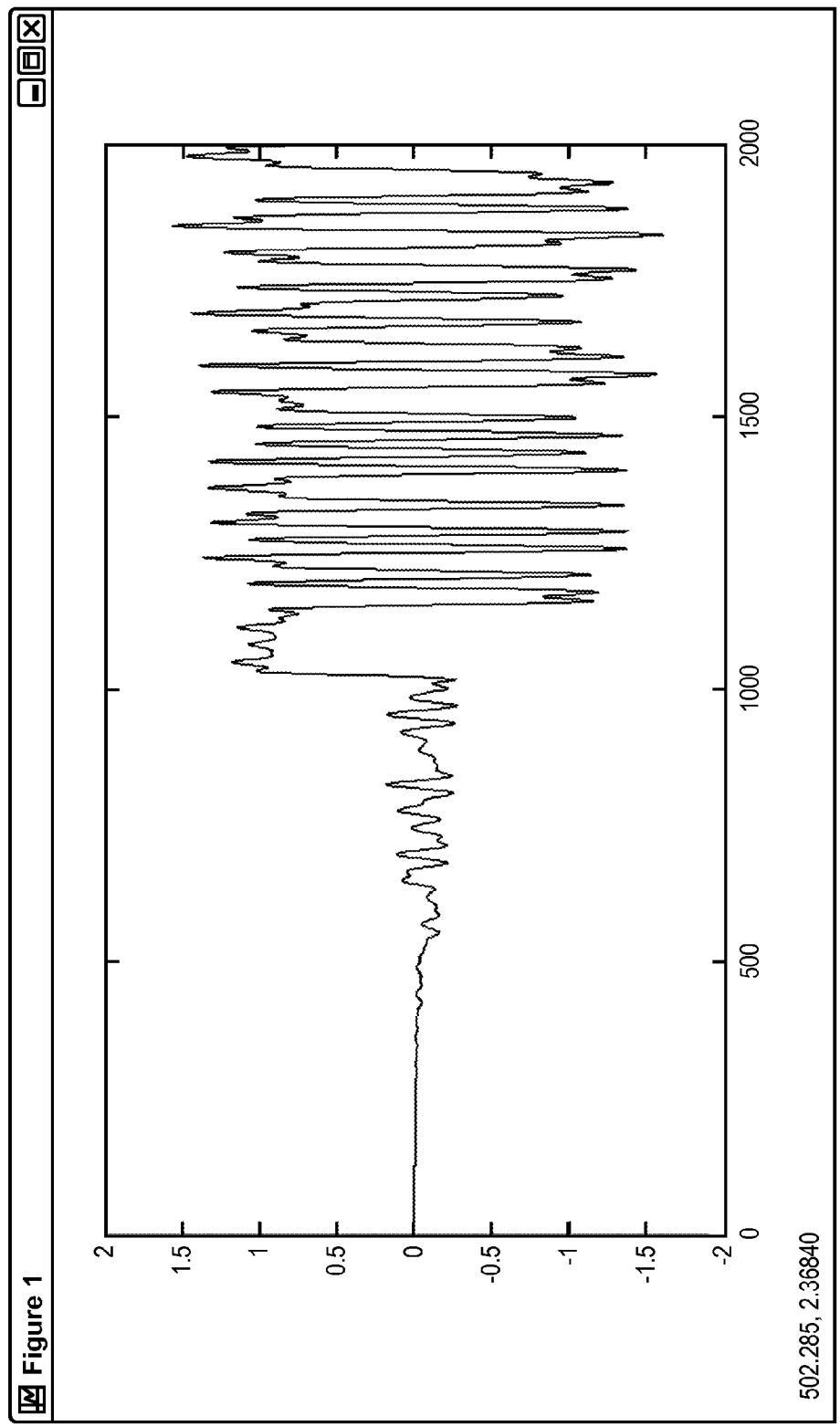
Figure 3H:
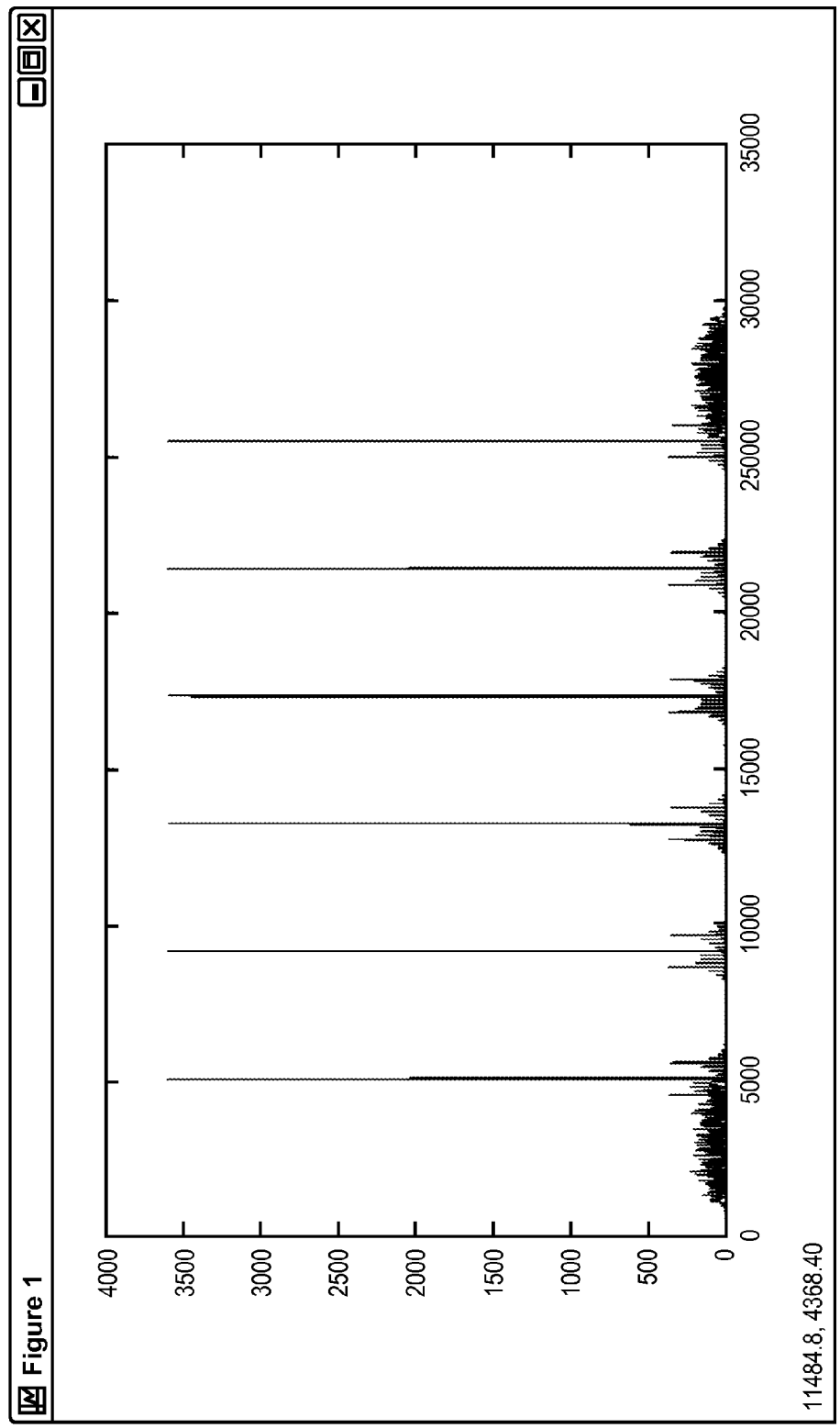

Assuming that an exact replica can be received, each of signal pieces must be moved back to the original location in order to reconstruct the original signal. As shown in FIGS. 3F-3G, this reconstruction was performed in a manner that was the reverse of the steps carried out by the transmitter. Each signal piece is mixed down to DC and then low-pass filtered to separate each signal piece. Next the signal piece is mixed down again to the correct spectral location. The frequency-domain representation of the result is shown in FIG. 3F, and the time-domain representation is shown in FIG. 3G. Thus, the signal is able to be reconstructed correctly. It should be understood that in some embodiments there is a lag that is due to the delay in the low pass filter. Additionally, in some embodiments, the received signal is also no longer rectangular because the sidelobes have been removed. However, when this signal is correlated with a copy of the rectangular PN code, the start time can be clearly seen in FIG. 3H. The six peaks correspond to the beginning of each PN code.

Transmitter

FIG. 4 discloses a transmitter 102 in accordance with some embodiments. In some embodiments, the transmitter architecture shown in FIG. 4 is used for all of the described spread spectrum signal splitting techniques. In fact, in some embodiments, the transmitter is oblivious to what technique it is using and what spectral area is transmitted, and thus the transmitter is capable of using any of the spread spectrum signal splitting techniques (e.g., discrete occupation, tailored occupation, or spectral distribution) or alternate between different ones of the spread spectrum signal splitting techniques. The transmitter simply pushes out a series of samples to be converted to analog levels before transmission to the receiver. The intelligence of what those samples should be, and by extension how the available spectrum is used, is kept in the central unit 106 (FIG. 1A), where computing resources are plentiful. Accordingly, the transmitters can be kept simple, straightforward, and all identical. In some embodiments, at an analog level, a 15 MHz-wide transmitter can be set within a 30 MHz span. Further, samples take the 15 MHz width and shape it so that the energy is only within discrete bandwidth intervals (e.g., the allocated spectral segments). The samples are organized as a single positive information bit. For a negative information bit, the negative of the samples are sent. The central unit strings together the desired information bits to create a packet.

As shown in FIG. 4, the transmitter includes memory 402 (e.g., nonvolatile memory), a direct memory access controller 404, a digital to analog converter 406, a microprocessor 408, a base oscillator 410, an RF phase locked loop circuit 412, a multiplier 414, and a band-pass filter 416. Memory 402 stores information bits received from the central unit 106 (FIG. 1A). In some embodiments, memory 402 is a single 16-bit-wide, 32 MB (256 Mb) NAND flash unit for memory, with a 30 ns read time, which allows for up to 66 MBps. It allows use of either 80 MSps or 125 MSps 8-bit DACs, the former of which are more stable and more expensive, the latter of which are the opposite. At a 60 MSps transmit sample rate, and a 1 Mcps spreading rate with 1023×8=8184 chips per information bit, we have 60×1023×8=491,040 sample bytes per information bit, and therefore that number of samples per zone. That typically requires a little under 16 MB of memory. In some embodiments, this is doubled for safety and to accommodate bad NAND blocks.

Receiver

Figure 5:
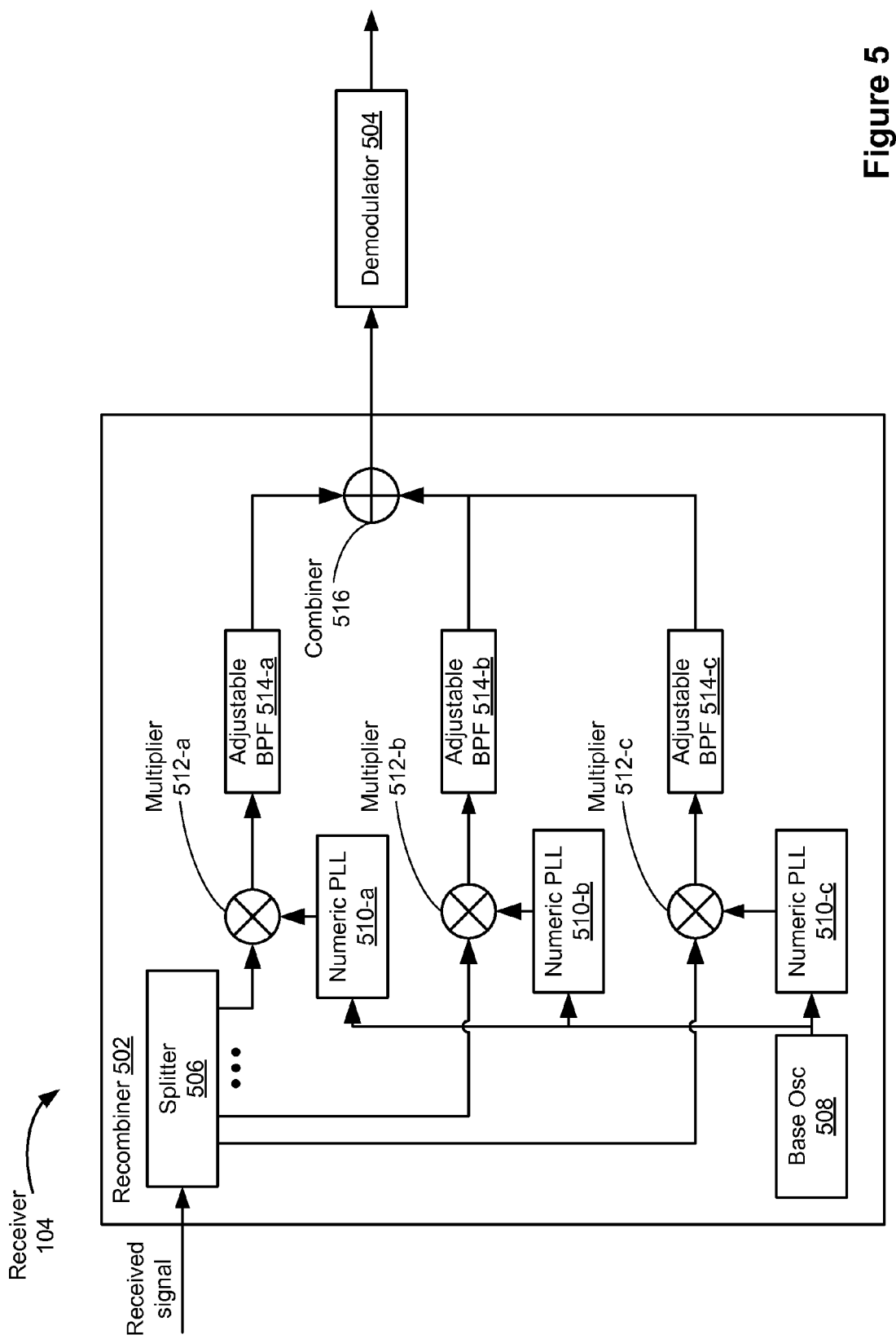
FIG. 5 is a block diagram illustrating a receiver in accordance with some embodiments.

FIG. 5 discloses a receiver 104 in accordance with some embodiments. Similar to the transmitter (FIG. 4), in some embodiments, a common receiver architecture is used for all of the described techniques. As shown in FIG. 5, the receiver includes at least a front end (i.e., recombiner 502) and a back end (i.e., demodulator 504). Typically a receiver will also include one or more processors and memory including volatile memory (e.g., random access memory), nonvolatile memory (e.g., Flash) or one or more magnetic disk storage devices (e.g., hard drives, etc.).

Figure 6:
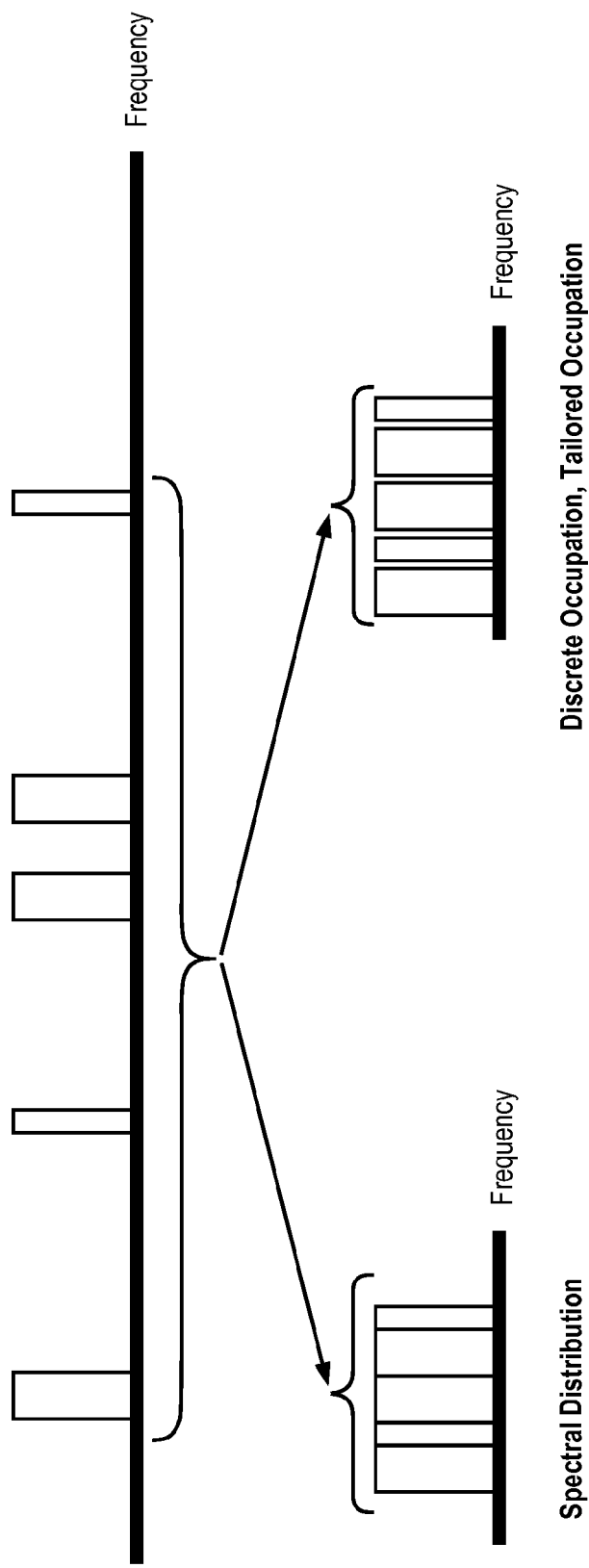
FIG. 6 is a timing diagram of received signals in accordance with some embodiments.

The front end compresses the received spectrum into a contiguous, or nearly contiguous, region for easier processing. As illustrated in FIG. 6, the front end either pushes spectra of interest exactly back together (e.g., when using spectral distribution) or back together with guardbands (e.g., when using discrete occupation or tailored occupation). Because the interesting spectra are on a much narrower frequency baseline after recombination, a lower-speed analog-to-digital converter and digital processing can be used to demodulate the signal. In some embodiments, the front end is analog. In other embodiments, the front end is digital.

As shown in FIG. 5, the recombiner includes a splitter 506, a basic oscillator 508, a plurality of numeric phase locked loops 510, a plurality of multipliers 512, a plurality of adjustable band-pass filters 514, and a combiner 516. The splitter 506 splits the received signal n-ways, where each of the n-ways corresponds to one of the discrete bandwidth intervals. Each of the plurality of numeric phase locked loops 510 receives a clock signal from the base oscillator 508. A common base oscillator 508 is important in order to maintain phase coherency. Each of the n signals is sent to a respective multiplier 512 for multiplication with an output from a respective numeric phase locked loop 510. The output of each multiplier 512 is then sent to a respective one of the plurality of adjustable band-pass filters 514. All of the n outputs of the plurality of adjustable band-pass filters 514 are then sent to the combiner 516 so that a signal that is as narrow as possible is output to the back end of the receiver (e.g., demodulator 504).

While the recombiner 502 is shown in FIG. 5 is entirely analog, an all-digital approach is possible. It should be understood that while such a digital approach would make the numeric phase locked loops and adjustable band-pass filters easier to implement, it would also typically require higher-speed hardware.

The back end processes each piece of spectrum (or combines each piece for detection) and demodulates if a signal is found. In some embodiments, the back end is digital. The demodulation technique used on the signal output from the front end is dependent upon the technique used to split and transmit the spread spectrum signal. Each technique is discussed in turn below.

Discrete Occupation.

To demodulate when discrete occupation is used, the demodulator 504 looks at each input center frequency digitally, applies CPDMA approaches to detect individual signals, and then decodes each bit at each center frequency. If the same spreading code is used for all bits, an M-transform detection can be used on a set of center frequencies and added to the magnitudes for each code phase for detection. Accordingly, even though many center frequencies are used, the computation required is the same as though the bits were sequenced in time instead of in frequency.

Tailored Occupation.

When tailored occupation is used, the demodulator looks at each discrete bandwidth interval digitally, applies CPDMA approaches specific to the tailored usage of that discrete bandwidth interval to detect the individual signals, and then decodes the bits(s) in each discrete bandwidth interval to demodulate the spread spectrum signal.

Spectral Distribution.

Figure 7:
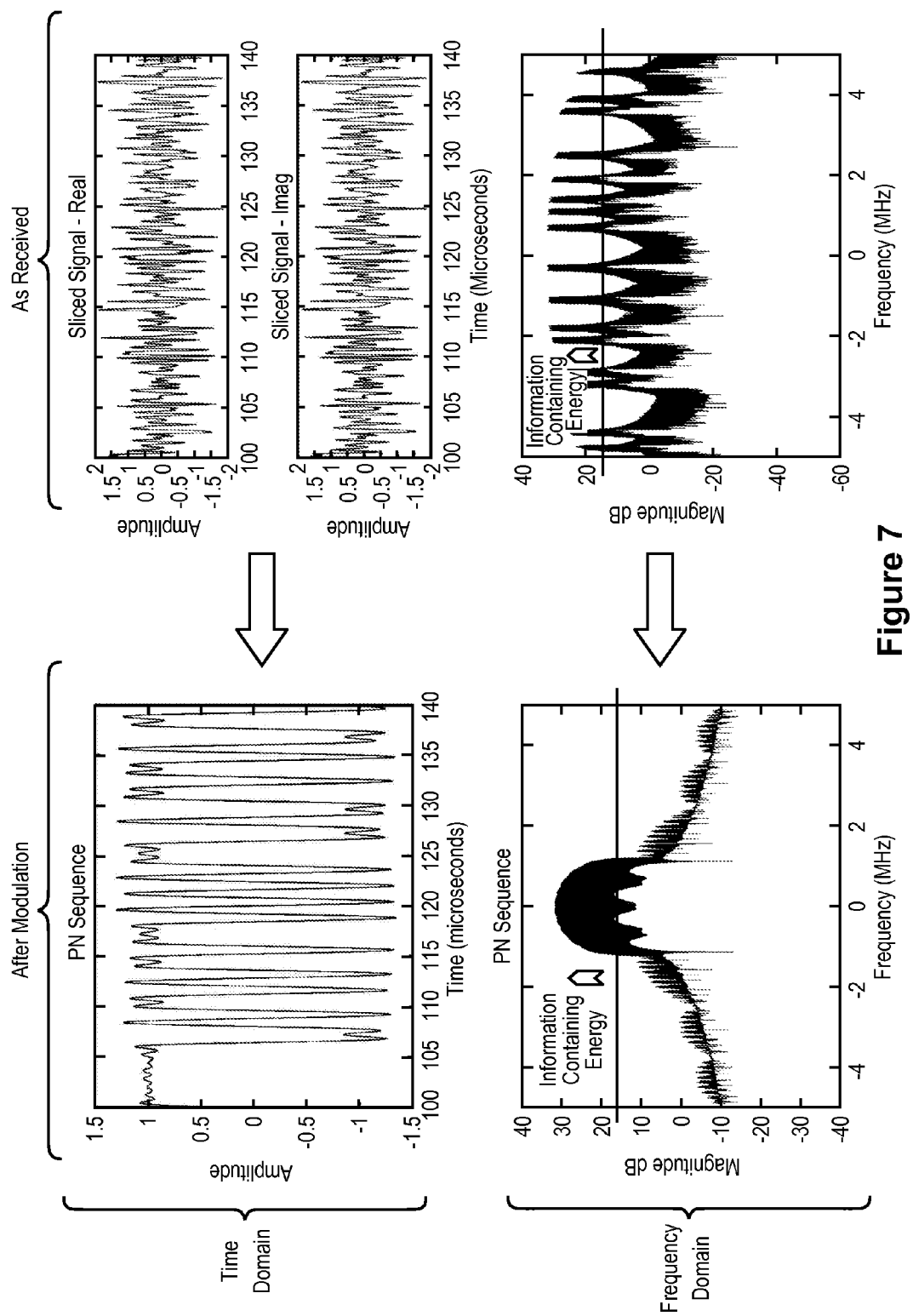
FIG. 7 is timing diagram of received signals in accordance with some embodiments.

Demodulation when spectral distribution is used treats the signal received from the front end as a contiguous spread spectrum signal to be decoded using CPDMA techniques. Because the front end phase-coherently recombines the transmitted spectral segments, the back end is oblivious to the fact that spectral disassembly even took place. Accordingly, as shown in FIG. 7, the images of time and frequency domain behavior are the opposite of what is shown in FIG. 3B.

M-transform detection and CPDMA demodulation techniques are described in detail in U.S. Pat. Nos. 6,985,512, 7,227,884, and 7,433,391, each of which are incorporated by reference herein.

Methods for Transmitting a Spread Spectrum Signal

Figure 8:
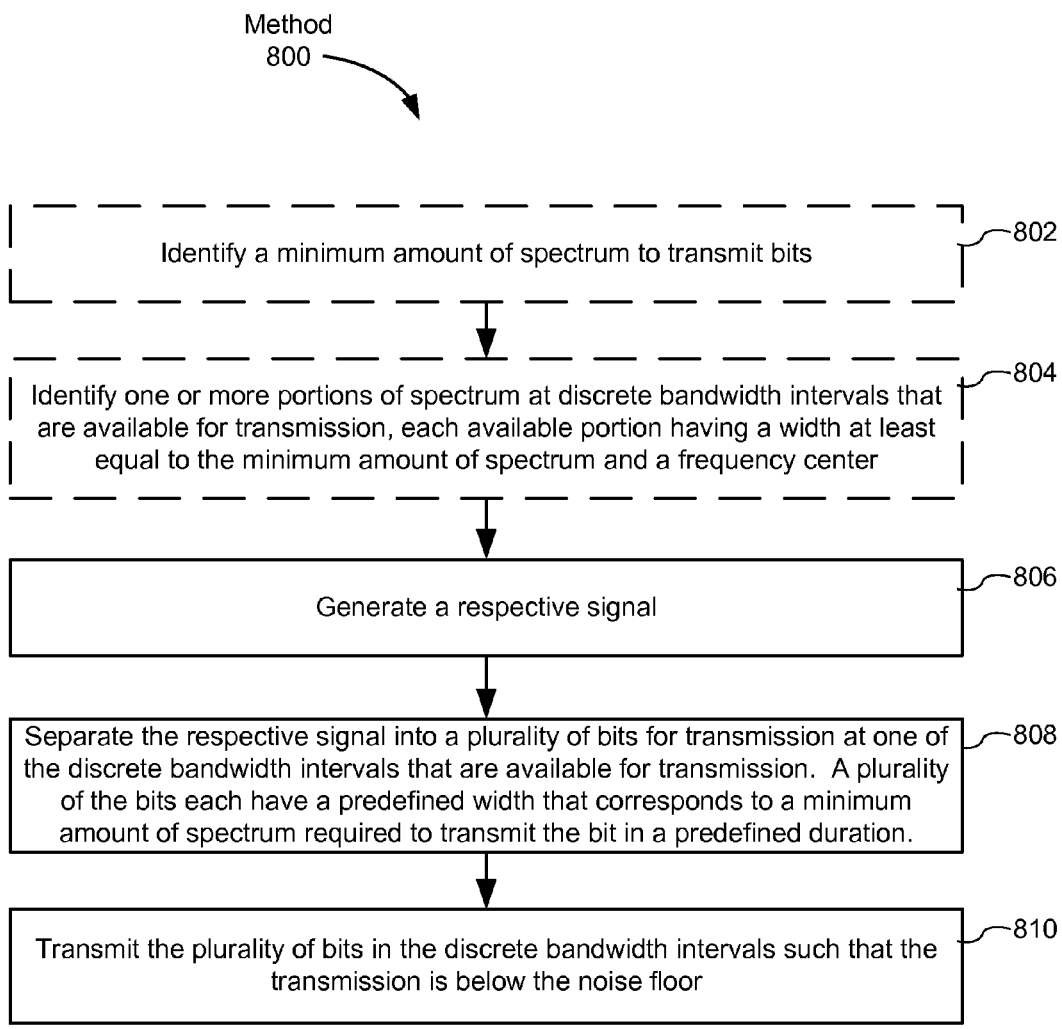
FIG. 8 is a flow chart of a method for transmitting a spread spectrum signal in accordance with some embodiments.

Attention is now directed towards FIG. 8, which illustrates a method 800 of transmitting a spread spectrum signal. In some embodiments, the method is performed at the transmitter (e.g., 102 in FIG. 4). In some other embodiments, the method is performed at multiple devices (e.g., some of the operations are performed at a central unit while other operations are performed at the transmitter).

In some embodiments, a minimum amount of spectrum to transmit bits is identified (802) (e.g., either by the transmitter or by the central unit). In some embodiments, one or more portions of spectrum at discrete bandwidth intervals that are available for transmission are identified (804) (e.g., either by the transmitter or by the central unit). A respective signal is generated (806) by the transmitter. The transmitter separates (808) the respective signal into multiple bits for transmission at one of the discrete bandwidth intervals that are available for transmission. A plurality of the bits each have a predefined width that corresponds to a minimum amount of spectrum required to transmit the bit in a predefined duration. In some embodiments, the plurality of bits includes all of the bits. The transmitter transmits (810) the plurality of bits in the discrete bandwidth intervals such that the transmission is below the noise floor.

Figure 9:
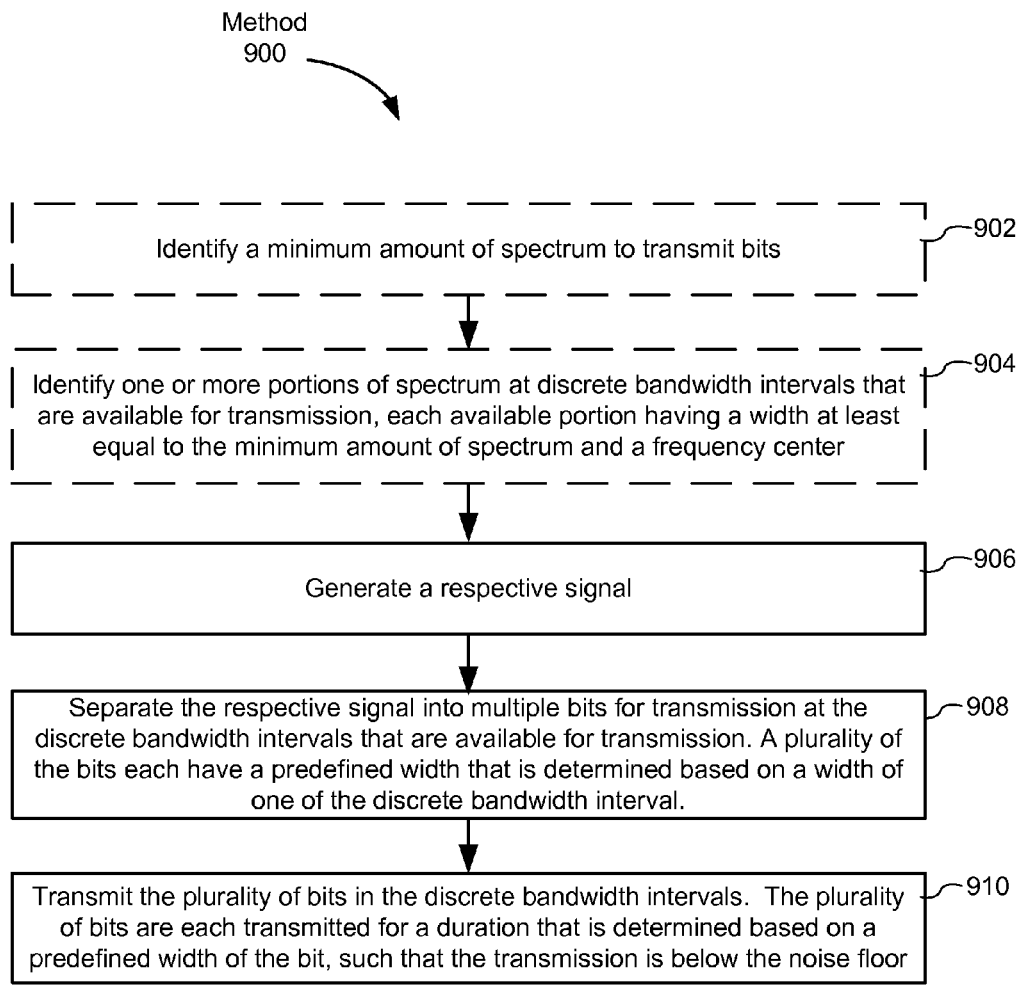
FIG. 9 is a flow chart of a method for transmitting a spread spectrum signal in accordance with some embodiments.

Attention is now directed towards FIG. 9, which illustrates a method 900 of transmitting a spread spectrum signal. In some embodiments the method is performed at the transmitter (e.g., 102 in FIG. 4). In some other embodiments, the method is performed at multiple devices (e.g., some of the operations are performed at a central unit while other operations are performed at the transmitter).

In some embodiments, a minimum amount of spectrum to transmit bits is identified (902) (e.g., either by the transmitter or by the central unit). In some embodiments, one or more portions of spectrum at discrete bandwidth intervals that are available for transmission are identified (904) (e.g., either by the transmitter or by the central unit). The transmitter generates (906) a respective signal. The transmitter separates (908) the respective signal into multiple bits for transmission at the discrete bandwidth intervals that are available for transmission. A plurality of the bits each have a predefined width that is determined based on a width of one of the discrete bandwidth intervals. In some embodiments, the plurality of bits includes all of the bits. The transmitter transmits (910) the plurality of bits in the discrete bandwidth intervals. The plurality of bits are each transmitted for a duration that is determined based on a predefined width of the bit, such that the transmission is below the noise floor.

Figure 10:
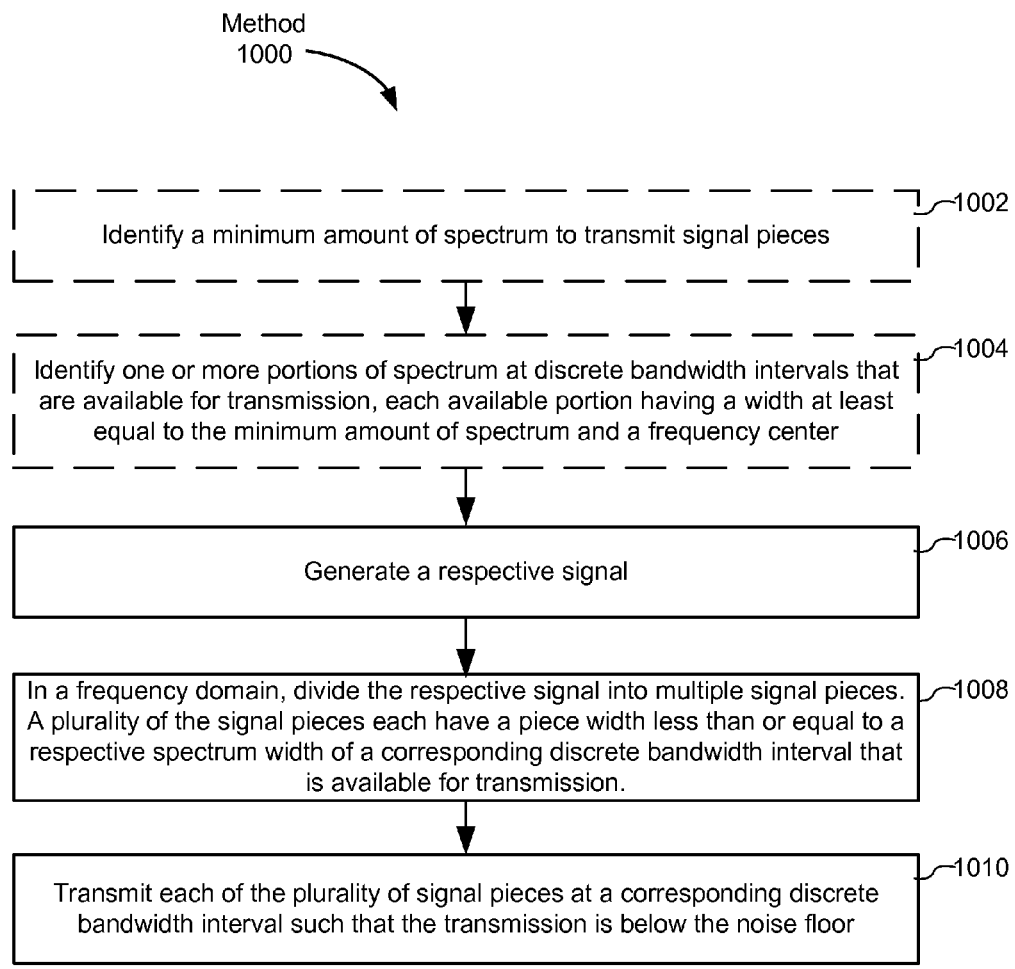
FIG. 10 is a flow chart of a method for transmitting a spread spectrum signal in accordance with some embodiments.

Attention is now directed towards FIG. 10, which illustrates a method 1000 of transmitting a spread spectrum signal. In some embodiments, the method is performed at the transmitter (e.g., 102 in FIG. 4). In some other embodiments, the method is performed at multiple devices (e.g., some of the operations are performed at a central unit while other operations are performed at the transmitter).

In some embodiments, a minimum amount of spectrum to transmit bits is identified (1002) (e.g., either by the transmitter or by the central unit). In some embodiments, one or more portions of spectrum at discrete bandwidth intervals that are available for transmission are identified (1004) (e.g., either by the transmitter or by the central unit). The transmitter generates (1006) a respective signal. In a frequency domain, the transmitter divides (1008) the respective signal into a plurality of signal pieces. A plurality of the signal pieces each have a piece width less than or equal to a respective spectrum width of a corresponding discrete bandwidth interval that is available for transmission. In some embodiments, the plurality of signal pieces includes all of the signal pieces. The transmitter transmits (1010) each of the plurality of signal pieces at a corresponding discrete bandwidth interval such that the transmission is below the noise floor.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of transmitting a signal to one or more receivers using spread spectrum signals, the method comprising:
at a transmitter having a processor and memory:

obtaining information identifying a plurality of discontinuous discrete bandwidth intervals that are only available for transmission at an energy level below a noise floor;

generating a signal;

separating the signal into a plurality of bits, wherein each of the plurality of bits is configured for transmission in a predefined bandwidth that corresponds to a minimum amount of spectrum required to transmit the bit in a predefined duration; and transmitting, the plurality of bits in the plurality of discontinuous discrete bandwidth intervals with an energy level such that each of the plurality of bits are transmitted below the noise floor to a satellite via an uplink for further transmission to the one or more receivers via a downlink, wherein at least two bits of the plurality of bits are transmitted in each of the plurality of discontinuous discrete bandwidth intervals and the at least two bits have different center frequencies and are transmitted at the same time, wherein a respective discontinuous discrete bandwidth interval of the plurality of discontinuous discrete bandwidth intervals includes at least twice the minimum amount of bandwidth necessary to transmit a respective bit of the plurality of bits.

2. A method of transmitting a signal to one or more receivers using spread spectrum signals, the method comprising:

at a transmitter having a processor and memory:

obtaining information identifying a plurality of discontinuous discrete bandwidth intervals that are only available for transmission at an energy level below a noise floor;

generating a signal;

separating the signal into a plurality of bits, wherein each of the plurality of bits is configured for transmission in a customized bandwidth that is determined based on one of the plurality of discontinuous discrete bandwidth intervals; and transmitting, to a satellite via an uplink for further transmission to the one or more receivers via a downlink, the plurality of bits in the plurality of discontinuous discrete bandwidth intervals with an energy level such that each of the plurality of bits are transmitted below the noise floor, wherein:

the plurality of bits are transmitted for a duration that is determined based on the customized bandwidth of each bit and at least two of the plurality of bits are transmitted simultaneously;

a respective subset of two or more bits of the plurality of bits is transmitted in each of the plurality of discontinuous discrete bandwidth intervals, and the two or more bits in the respective subset of the plurality of bits have a same center frequency and are sequentially transmitted at different times; and a respective discontinuous discrete bandwidth interval of the plurality of discontinuous discrete bandwidth intervals includes at least twice the minimum amount of bandwidth necessary to transmit a respective bit of the plurality of bits.

3. A transmitter for transmitting a signal to one or more receivers using spread spectrum signals, the transmitter comprising:

a processor; and memory, wherein the transmitter is configured to:

obtain information identifying a plurality of discontinuous discrete bandwidth intervals that are only available for transmission at an energy level below a noise floor;

generate a signal;

separate the signal into a plurality of bits, wherein each of the plurality of bits is configured for transmission in a predefined bandwidth that corresponds to a minimum amount of spectrum required to transmit the bit in a predefined duration; and transmit, the plurality of bits in the plurality of discontinuous discrete bandwidth intervals with an energy level such that each of the plurality of bits are transmitted below the noise floor to a satellite via an uplink for further transmission to the one or more receivers via a downlink, wherein at least two bits of the plurality of bits are transmitted in each of the plurality of discontinuous discrete bandwidth intervals and the at least two bits have different center frequencies and are transmitted at the same time, wherein a respective discontinuous discrete bandwidth interval of the plurality of discrete bandwidth intervals includes at least twice the minimum amount of bandwidth necessary to transmit a respective bit of the plurality of bits.

4. A transmitter for transmitting a signal to one or more receivers using spread spectrum signals, the transmitter comprising:

a processor; and memory, wherein the transmitter is configured to:

obtain information identifying a plurality of discontinuous discrete bandwidth intervals that are only available for transmission at an energy level below a noise floor;

generate a signal;

separate the signal into a plurality of bits, wherein each of the plurality of bits is configured for transmission in a customized bandwidth that is determined based on one of the plurality of discontinuous discrete bandwidth intervals; and transmit, to a satellite via an uplink for further transmission to the one or more receivers via a downlink, the plurality of bits in the plurality of discontinuous discrete bandwidth intervals with an energy level such that each of the plurality of bits are transmitted below the noise floor, wherein:

the plurality of bits are transmitted for a duration that is determined based on the customized bandwidth of each bit and at least two of the plurality of bits are transmitted simultaneously; and a respective subset of two or more bits of the plurality of bits is transmitted in each of the plurality of discontinuous discrete bandwidth intervals, and the two or more bits in the respective subset of the plurality of bits have a same center frequency and are sequentially transmitted at different times; and a respective discontinuous discrete bandwidth interval of the plurality of discontinuous discrete bandwidth intervals includes at least twice the minimum amount of bandwidth necessary to transmit a respective bit of the plurality of bits.

\* \* \* \* \*